US011873389B2

United States Patent
Matsumoto et al.

(10) Patent No.: US 11,873,389 B2
(45) Date of Patent: Jan. 16, 2024

(54) COMPOSITION AND MOLDED ARTICLE

(71) Applicants: AKITA UNIVERSITY, Akita (JP); DAIKIN INDUSTRIES, LTD., Osaka (JP)

(72) Inventors: Kazuya Matsumoto, Akita (JP); Mitsutoshi Jikei, Akita (JP); Shushi Yamada, Akita (JP); Tsuyoshi Noguchi, Osaka (JP); Fumihiro Kamiya, Osaka (JP); Yoshiho Yanagida, Osaka (JP)

(73) Assignees: Akita University, Akita (JP); DAIKIN INDUSTRIES, LTD., Osaka (JP)

( * ) Notice: Subject to any disclaimer, the term of this patent is extended or adjusted under 35 U.S.C. 154(b) by 276 days.

(21) Appl. No.: 17/417,964

(22) PCT Filed: Dec. 27, 2019

(86) PCT No.: PCT/JP2019/051608
§ 371 (c)(1),
(2) Date: Jun. 24, 2021

(87) PCT Pub. No.: WO2020/138493
PCT Pub. Date: Jul. 2, 2020

(65) Prior Publication Data
US 2022/0073722 A1 Mar. 10, 2022

(30) Foreign Application Priority Data
Dec. 28, 2018 (JP) .................. 2018-246995

(51) Int. Cl.
| | |
|---|---|
| *C08L 27/18* | (2006.01) |
| *C08L 83/08* | (2006.01) |
| *C08F 214/18* | (2006.01) |
| *C08G 77/385* | (2006.01) |
| *C08G 77/388* | (2006.01) |
| *C08G 77/00* | (2006.01) |
| *C08K 5/18* | (2006.01) |
| *C08F 214/26* | (2006.01) |
| *C08G 69/08* | (2006.01) |
| *C08G 77/04* | (2006.01) |
| *C08L 27/12* | (2006.01) |

(52) U.S. Cl.
CPC .......... *C08L 27/18* (2013.01); *C08F 214/184* (2013.01); *C08F 214/262* (2013.01); *C08G 69/08* (2013.01); *C08G 77/045* (2013.01); *C08G 77/385* (2013.01); *C08G 77/388* (2013.01); *C08G 77/80* (2013.01); *C08K 5/18* (2013.01); *C08L 27/12* (2013.01); *C08L 83/08* (2013.01); *C08F 2800/10* (2013.01)

(58) Field of Classification Search
CPC .. C08G 77/445; C08G 77/452; C08G 77/455; C08G 77/458
See application file for complete search history.

(56) References Cited

U.S. PATENT DOCUMENTS

| | | | | |
|---|---|---|---|---|
| 2003/0207966 | A1* | 11/2003 | Ohtsuka | .................... C08F 8/08 524/394 |
| 2018/0030246 | A1 | 2/2018 | Matsumoto et al. | |
| 2019/0023851 | A1 | 1/2019 | Yajima et al. | |
| 2019/0169415 | A1* | 6/2019 | Matsumoto | ....... H01J 37/32513 |

FOREIGN PATENT DOCUMENTS

| | | | |
|---|---|---|---|
| EP | 3 260 490 A1 | | 12/2017 |
| JP | 11-172074 A | | 6/1999 |
| JP | 20040182945 A | * | 7/2004 |
| JP | 2015-15355 A | * | 7/2015 |
| JP | 2015-135355 A | * | 7/2015 |
| JP | 2018-024612 A | | 2/2018 |
| KR | 10-2017-0109011 A | | 9/2017 |
| TW | 201700545 A | | 1/2017 |
| TW | 201825597 A | | 7/2018 |
| WO | 2016/133108 A1 | | 8/2016 |
| WO | 2017/126688 A1 | | 7/2017 |
| WO | 2018/030427 A1 | | 2/2018 |

OTHER PUBLICATIONS

Chapter 7 from the book Silicon-containing Dendritic Polymers, Advances in Silicon Science 2 authored by P.R Dvornic et al. and published by Springer Science + Business Media B.V. 2009.*
machine translation of JP 2015-135355 A (no date).*
International Preliminary Report (with translation of the Written Opinion) dated Jun. 16, 2021, issued by the International Bureau in application No. PCT/JP2019/051608.
Extended European Search Report dated Aug. 24, 2022 in European Application No. 19904237.5.
Kazuya Matsumoto et al., "Synthesis and Properties of Aromatic Polyamide Dendrimers with Polyhedral Oligomeric Silsesquioxane Cores", Electronic Supplementary Material (ESI) for Polymer Chemistry, The Royal Society of Chemistry 2015, pp. S1-S9.
Isao Washio et al., "Facile Synthesis of Amine-Terminated Aromatic Polyamide Dendrimers via a Divergent Method", Organic Letters 2007, pp. 1363-1366, vol. 9, No. 7.
Thierry Fouquet et al., "Tandem mass spectrometry of electrosprayed polyhedral oligomeric silsesquioxane compounds with different substituents", Rapid Communications in Mass Spectrometry 2012, pp. 765-774, vol. 26.
International Search Report for PCT/JP2019/051608 dated Mar. 10, 2020 [PCT/ISA/210].

* cited by examiner

*Primary Examiner* — Marc S Zimmer
(74) *Attorney, Agent, or Firm* — Sughrue Mion, PLLC

(57) ABSTRACT

A composition including a fluorine-containing polymer and a silicon-containing compound, wherein the phosphorus content in the composition is 20 ppm or less. Also disclosed is a molded article obtained from the composition, and a second composition containing a fluorine-containing polymer and a silicon-containing polymer, wherein a content of an amide solvent in the composition is less than 1000 ppm.

9 Claims, No Drawings

COMPOSITION AND MOLDED ARTICLE

CROSS REFERENCE TO RELATED APPLICATIONS

This application is a National Stage of International Application No. PCT/JP2019/051608 filed Dec. 27, 2019, claiming priority based on Japanese Patent Application No. 2018-246995 filed Dec. 28, 2018.

TECHNICAL FIELD

The present disclosure relates to a composition comprising a fluorine-containing polymer, and a molded article obtained from the composition.

BACKGROUND ART

Fluorine-containing elastomers, particularly perfluoroelastomers that include a tetrafluoroethylene (TFE) unit, have excellent chemical resistance, solvent resistance, and heat resistance, and therefore are widely used as a sealing material in harsh environments such as in the aerospace field, semiconductor fabrication equipment field, and chemical plant field.

Further, to improve the properties required for the sealing material, it is known to add a filler to the fluorine-containing elastomer.

For example, Patent Document 1 proposes adding a cage-type silsesquioxane to a fluorine-containing elastomer.

RELATED ART

Patent Documents
Patent Document 1: International Publication No. 2016/133108

SUMMARY OF THE INVENTION

Problem to be Solved by the Invention

The presence of impurities in the semiconductor fabrication process has a serious impact on the yield and reliability of semiconductor devices. Phosphorus and the like are known as such impurities.

A first object of the present disclosure is to provide a composition comprising a fluorine-containing polymer and a silicon-containing compound, wherein the phosphorus content in the composition is very low.

Further, a second object of the present disclosure is to provide a composition comprising a fluorine-containing polymer and a silicon-containing compound, wherein a content of amide solvent in the composition is very low.

In addition, a third object of the present disclosure is to provide a composition comprising a fluorine-containing polymer and a silicon-containing compound, wherein the composition can be easily produced even when high purity is required.

Means for Solving the Problem

According to the present disclosure, provided is a composition comprising a fluorine-containing polymer and a silicon-containing compound, wherein the phosphorus content in the composition is 20 ppm or less (in the present disclosure, sometimes referred to as "the first composition of the present disclosure").

Further, according to the present disclosure, provided is a composition comprising a fluorine-containing polymer and a silicon-containing compound, wherein the content of an amide solvent in the composition is less than 1000 ppm (in the present disclosure, sometimes referred to as "the second composition of the present disclosure").

In the first and second compositions of the present disclosure, the silicon-containing compound is preferably a cage-type silsesquioxane represented by formula (1):

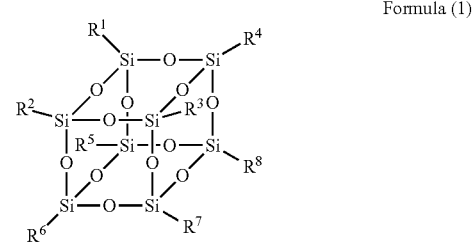

Formula (1)

wherein $R^1$ to $R^8$ are each independently a hydrogen atom, a halogen atom, or an organic group, and at least one of $R^1$ to $R^8$ is an organic group.

In the first and second compositions of the present disclosure, $R^1$ to $R^8$ each independently include preferably a terminal group T represented by formula (2):

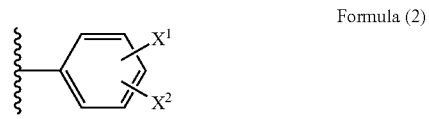

Formula (2)

wherein $X^1$ and $X^2$ are each independently —$NH_2$, —OH, —SH, —H, —NH—CO—$CF_3$, —NH—CO—Ar, wherein Ar is a substituted or unsubstituted aryl group, a group represented by the following formula:

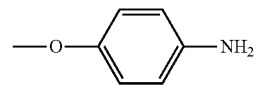

a group represented by the following formula:

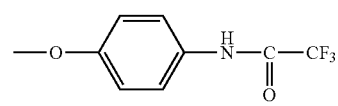

or a group represented by the following formula:

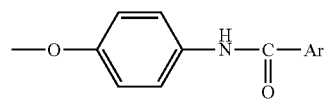

wherein Ar is a substituted or unsubstituted aryl group.

Further, according to the present disclosure, provided is a composition comprising a fluorine-containing polymer and, as a silicon-containing compound, a cage-type silsesquioxane represented by formula (1) (in the present disclosure, sometimes referred to as "the third composition of the present disclosure").

Formula (1)

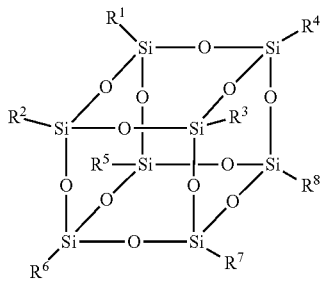

wherein $R^1$ to $R^8$ are each independently a hydrogen atom, a halogen atom, or an organic group, and at least one of $R^1$ to $R^8$ is an organic group containing a terminal group T represented by formula (3-1) or formula (3-2):

Formula (3-1)

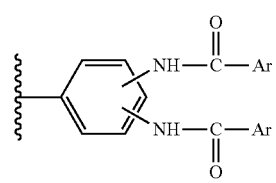

wherein each Ar is independently a substituted or unsubstituted aryl group,

Formula (3-2)

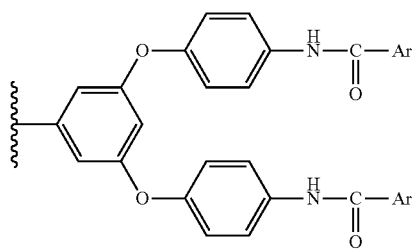

wherein each Ar is independently a substituted or unsubstituted aryl group.

In the third composition of the present disclosure, the terminal group T represented by formula (3-1) and formula (3-2) is preferably any of the following groups.

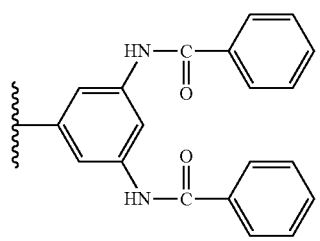 [SMILES: *c1cc(NC(=O)c2ccccc2)cc(NC(=O)c2ccccc2)c1]

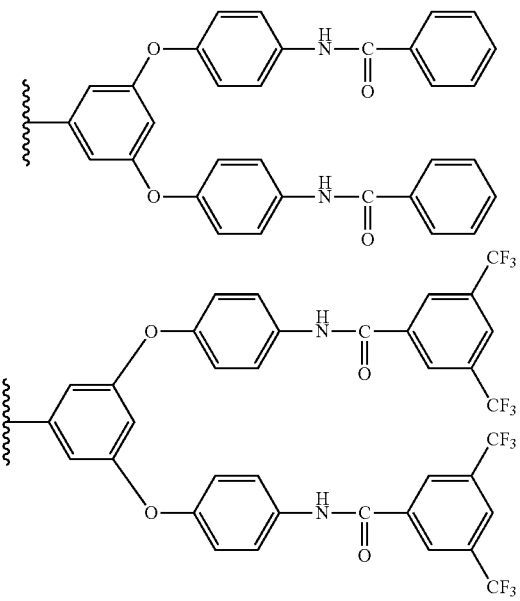

In the first, second, and third compositions of the present disclosure (in the present disclosure, sometimes simply referred to as "the composition of the present disclosure"), the cage-type silsesquioxane is preferably a dendrimer or a hyperbranched polymer.

In the composition of the present disclosure, the fluorine-containing polymer is preferably a fluorine-containing elastomer.

In the composition of the present disclosure, the content of the silicon-containing compound is preferably 0.5 to 100 parts by mass with respect to 100 parts by mass of the fluorine-containing polymer.

In the first and third compositions of the present disclosure, the content of an amide solvent is preferably less than 1000 ppm.

In the composition of the present disclosure, the content of a solvent not containing a fluorine atom is preferably less than 1000 ppm.

The composition of the present disclosure preferably further comprises a cross-linking agent.

The composition of the present disclosure is preferably a molding material.

Further, according to the present disclosure, provided is a molded article obtained from the composition.

Effects of Invention

According to the present disclosure, it is possible to provide a composition comprising a fluorine-containing polymer and a silicon-containing compound, wherein the phosphorus content in the composition is very low.

Further, according to the present disclosure, it is possible to provide a composition comprising a fluorine-containing polymer and a silicon-containing compound, wherein the content of an amide solvent in the composition is very low.

In addition, according to the present disclosure, it is possible to provide a composition comprising a fluorine-containing polymer and a silicon-containing compound, wherein the composition can be easily produced even when high purity is required.

DESCRIPTION OF EMBODIMENTS

Specific embodiments of the present disclosure will now be described in detail, but the present disclosure is not limited to the following embodiments.

First and second compositions of the present disclosure comprise a fluorine-containing polymer and a silicon-containing compound.

The silicon-containing compound may be an inorganic silicon compound or an organosilicon compound, but is preferably an organosilicon compound. Examples of the inorganic silicon compound include silicon oxide, silicon carbide, and silicon nitride. Further, the silicon-containing compound is preferably a compound known as a filler. That is, the first and second compositions of the present disclosure preferably comprise the above silicon-containing compound as a filler. In addition, the first and second compositions of the present disclosure may comprise an organosilicon compound and an inorganic silicon compound as the silicon-containing compound.

The silicon-containing compound is preferably a cage-type silsesquioxane represented by formula (1):

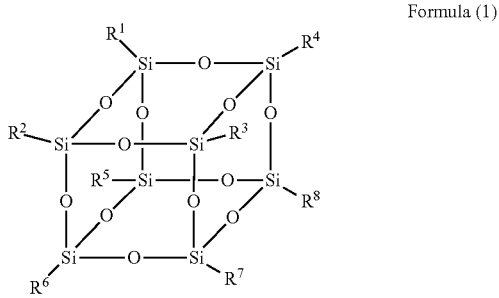

Formula (1)

wherein $R^1$ to $R^8$ are each independently a hydrogen atom, a halogen atom, or an organic group, and at least one of $R^1$ to $R^8$ is an organic group.

When the first and second compositions of the present disclosure comprise a cage-type silsesquioxane as the silicon-containing compound, a molded article can be provided that has excellent heat resistance and that has a small weight change against both fluorine-based plasma and oxygen plasma to which the article is exposed in a semiconductor fabrication process.

Further, the phosphorus content in the first composition of the present disclosure is 20 ppm or less. Therefore, even when the molded article obtained from the first composition of the present disclosure is used as a fluorine-containing polymer molded article used in a semiconductor fabrication process, phosphorus does not elute from the molded article, and a high quality semiconductor device can be manufactured in a high yield.

In the present disclosure, the phosphorus content in the composition can be determined by X-ray fluorescence analysis using a sheet of the composition.

In order to achieve the above-described low phosphorus content, it is required that a phosphorus compound is not used in the production process of the silicon-containing compound, such as the cage-type silsesquioxane. The method for producing such a cage-type silsesquioxane is represented by, for example, the following chemical reaction formula:

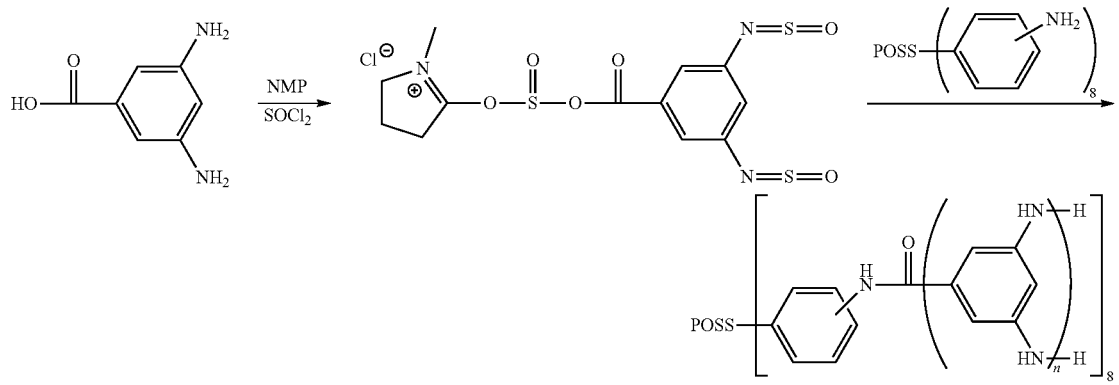

wherein n represents the number of structural units shown in parentheses. The number n is determined based on the number of generations, the molecular weight, or the molecular weight distribution of the cage-type silsesquioxane when the cage-type silsesquioxane is a dendrimer or a hyperbranched polymer.

In the above chemical reaction formula, 3,5-diaminobenzoic acid is used as a starting material, but other than 3,5-diaminobenzoic acid, 3,5-bis(4-aminophenoxy)benzoic acid and the like can be used. Further, these compounds may be an amine salt, and for example, 3,5-diaminobenzoic acid dihydrochloride can be used.

The above chemical reaction formula shows a reaction formula in which a compound having an activated carboxylic acid produced by a reaction of 3,5-diaminobenzoic acid with N-methyl-2-pyrrolidone (NMP) and $SOCl_2$ reacts with a cage-type silsesquioxane having an amino group to produce a hyperbranched polymer. However, the method for producing cage-type silsesquioxane is not limited to a method following this chemical reaction formula. The N-sulfinyl group in the compound having an activated carboxylic acid changes into an amino group by heating or reacting with water, and polymerization proceeds. Fro the viewpoint of obtaining a hyperbranched polymer having little coloration and a narrow molecular weight distribution, it is preferable to decompose the N-sulfinyl group by reacting with water and carry out the polymerization reaction without heating.

Each reaction in the above chemical reaction formula can be carried out in a solvent. Examples of the solvent include N-methylpyrrolidone (NMP), N-ethyl-2-pyrrolidone (NEP), dimethylformamide (DMF), N,N-dimethylacetamide (DMAc), N-n-butylpyrrolidone, N-isobutylpyrrolidone, N-t-butylpyrrolidone, N-n-pentylpyrrolidone, N-(methyl-substituted butyl)pyrrolidone, cyclic methyl-substituted N-propylpyrrolidone, cyclic methyl-substituted N-butylpyrrolidone, N-(methoxypropyl)pyrrolidone, 1,5-dimethyl-pyrrolidone, dipropylene glycol dimethyl ether, poly(ethylene glycol)dimethyl ether, diethylene glycol diethyl ether, 1,3-dioxolane, dimethyl sulfoxide (DMSO), methyl-5-(dimethylamino)-2-methyl-5-oxopentanoate, 1,3-dimethyl-2-imidazolidinone (IMI), sulfolane, tetrahydrofuran (THF), acetone, and the like.

As the solvent, a solvent not containing a fluorine atom is preferable, and an amide solvent is more preferable. Still more preferably, the solvent is at least one selected from the group consisting of N-methylpyrrolidone (NMP), N-ethyl-2-pyrrolidone (NEP), dimethylformamide (DMF), N,N-dimethylacetamide (DMAc), N-n-butylpyrrolidone, N-isobutylpyrrolidone, N-t-butylpyrrolidone, N-n-pentylpyrrolidone, N-(methyl-substituted butyl)pyrrolidone, cyclic methyl-substituted N-propylpyrrolidone, cyclic methyl-substituted N-butylpyrrolidone, N-(methoxypropyl) pyrrolidone, and 1,5-dimethyl-pyrrolidone.

The solvent may be N-methylpyrrolidone (NMP), N,N-dimethylacetamide (DMAc), or the like. Further, as the solvent, it is preferable to use a solvent having no reproductive or developmental toxicity. Examples of the solvent having no reproductive or developmental toxicity include N-n-butylpyrrolidone, N-isobutylpyrrolidone, N-t-butylpyrrolidone, N-n-pentylpyrrolidone, N-(methyl-substituted butyl)pyrrolidone, cyclic methyl-substituted N-propylpyrrolidone, cyclic methyl-substituted N-butylpyrrolidone, N-(methoxypropyl)pyrrolidone, 1,5-dimethyl-pyrrolidone, dipropylene glycol dimethyl ether, poly(ethylene glycol) dimethyl ether, diethylene glycol diethyl ether, 1,3-dioxolane, dimethyl sulfoxide (DMSO), methyl-5-(dimethylamino)-2-methyl-5-oxopentanoate, 1,3-dimethyl-2-imidazolidinone (DMI), and the like.

The boiling point of the solvent is not particularly limited. According to the present disclosure, even when a solvent having a relatively high boiling point of 150° C. or higher, 170° C. or higher, 190° C. or higher, or 200° C. or higher is used, a silicon-containing compound such as a cage-type silsesquioxane with a low content of residual solvent, such as the amide solvent and the solvent not containing a fluorine atom, can be produced, and further, a composition with a very low solvent content can be obtained. The boiling point of the solvent may be 300° C. or lower, 270° C. or lower, 240° C. or lower, or 210° C. or lower.

After the above-described production method, for example, the terminals of $R^1$ to $R^8$ may be converted into desired organic groups by a production method represented by the following chemical reaction formula:

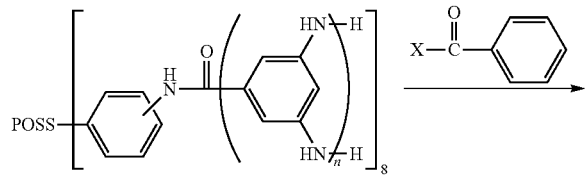

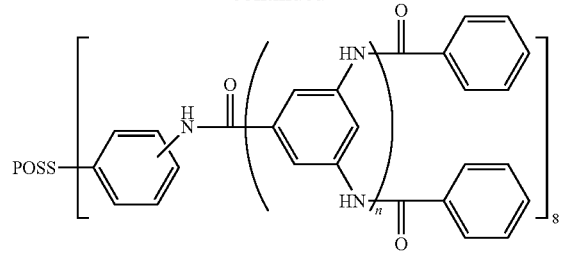

wherein X represents a halogen atom such as a chlorine atom.

In the above chemical reaction formula, the terminal of any of $R^1$ to $R^8$ is converted into a phenyl group using a compound represented by X—CO-Ph. However, the compound for converting the terminal is not limited to this, and other compounds, for example, a compound represented by X—CO—Ar (Ar is a substituted or unsubstituted aryl group) and the like can be used. By converting the terminals of $R^1$ to $R^8$ to a desired organic group, the third composition of the present disclosure can be easily produced.

After the desired compound is obtained, the obtained compound may optionally be washed with alcohol. In addition, operations such as filtration and drying may be performed.

In addition, the second composition of the present disclosure may contain an amide solvent, but the content of the amide solvent is less than 1000 ppm. Therefore, by using the second composition of the present disclosure, it is possible to efficiently produce a molded article while suppressing the occurrence of molding defects such as foaming caused by residual amide solvent. Further, even when the molded article obtained from the second composition of the present disclosure is used as a fluorine-containing polymer molded article used in a semiconductor fabrication process, residual amide solvent does not elute from the molded article, and a high quality semiconductor device can be manufactured in a high yield.

Examples of the amide solvent include those given as examples of the amide solvent to be used for producing the silicon-containing compound such as a cage-type silsesquioxane. The amide solvent preferably does not contain a fluorine atom.

The content of the amide solvent in the second composition of the present disclosure is preferably 300 ppm or less, more preferably 60 ppm or less, and most preferably 10 ppm or less. The lower limit of the content of the amide solvent is not limited, and the lower it is, the more preferable, but the lower limit may be, for example, 1 ppm or more. In this disclosure, unless stated otherwise, "ppm" is based on mass.

The second composition of the present disclosure may contain a solvent not containing a fluorine atom, but the content of the solvent not containing a fluorine atom is preferably less than 1000 ppm. Therefore, by using the second composition of the present disclosure, it is possible to efficiently produce a molded article while suppressing the occurrence of molding defects such as foaming caused by the solvent not containing a fluorine atom which remains in the composition. Further, even when the molded article obtained from the second composition of the present disclosure is used as a fluorine-containing polymer molded article used in a semiconductor fabrication process, the solvent not containing a fluorine atom which remains in the composition does not elute from the molded article, and a high quality semiconductor device can be manufactured in a high yield.

Examples of the solvent not containing a fluorine atom include those given as examples of the solvent used for producing the silicon-containing compound such as a cage-type silsesquioxane.

The content of the solvent not containing a fluorine atom in the second composition of the present disclosure is preferably 300 ppm or less, more preferably 60 ppm or less, and most preferably 10 ppm or less. The lower limit of the content of the solvent not containing a fluorine atom is not limited, and the lower it is, the more preferable, but the lower limit may be, for example, 1 ppm or more.

In order to achieve the above-described solvent content, it is preferable to obtain the compound by a reaction following the chemical reaction formula described above, and then dry the obtained compound under appropriate conditions. The drying temperature is preferably 100 to 300° C., and more preferably 150 to 200° C. A relatively high drying temperature is particularly suitable when the compound obtained by the reaction contains a solvent having a relatively high boiling point, such as NMP.

The drying time is preferably 1 to 12 hours, and more preferably 2 to 6 hours.

The drying is preferably performed under reduced pressure, and the drying pressure is preferably 1 to 1000 Pa, and more preferably 1 to 100 Pa.

By drying the compound obtained by the reaction under appropriate conditions, a compound with a small content of the residual solvent can be obtained, and as a result, the second composition of the present disclosure can be easily produced. In the present disclosure, the content of the solvent in the composition can be determined by gas chromatography.

The phosphorus content in the second composition of the present disclosure is preferably 20 ppm or less. When the phosphorus content is 20 ppm or less, even when the molded article obtained from the second composition of the present disclosure is used as a fluorine-containing polymer molded article used in a semiconductor fabrication process, residual solvent and phosphorous do not elute from the molded article, and a high quality semiconductor device can be manufactured in a high yield.

Further, the first composition of the present disclosure may also contain an amide solvent, but the content of the amide solvent is preferably less than 1000 ppm. By reducing the content of the amide solvent which remains in the first composition of the present disclosure, it is possible to efficiently produce a molded article while suppressing the occurrence of molding defects such as foaming caused by residual amide solvent. In addition, even when the molded article obtained from the first composition of the present disclosure is used as a fluorine-containing polymer molded article used in a semiconductor fabrication process, phosphorous and residual amide solvent do not elute from the molded article, and a high quality semiconductor device can be manufactured in a high yield.

Examples of the amide solvent include those given as examples of the amide solvent to be used for producing the silicon-containing compound such as a cage-type silsesquioxane. The amide solvent preferably does not contain a fluorine atom.

The content of the amide solvent in the first composition of the present disclosure is preferably 300 ppm or less, more preferably 60 ppm or less, and most preferably 10 ppm or less. The lower limit of the content of the amide solvent is not limited, and the lower it is, the more preferable, but the lower limit may be, for example, 1 ppm or more.

Further, the first composition of the present disclosure may contain a solvent not containing a fluorine atom, but the content of the solvent not containing a fluorine atom is preferably less than 1000 ppm. By reducing the content of the solvent not containing a fluorine atom which remains in the first composition of the present disclosure, it is possible to efficiently produce a molded article while suppressing the occurrence of molding defects such as foaming caused by the solvent not containing a fluorine atom which remains in the composition. In addition, even when the molded article obtained from the first composition of the present disclosure is used as a fluorine-containing polymer molded article used in a semiconductor fabrication process, phosphorous and the solvent not containing a fluorine atom do not elute from the molded article, and a high quality semiconductor device can be manufactured in a high yield.

Examples of the solvent not containing a fluorine atom include those given as examples of the solvent used for producing the silicon-containing compound such as a cage-type silsesquioxane.

The content of the solvent not containing a fluorine atom in the first composition of the present disclosure is preferably 300 ppm or less, more preferably 60 ppm or less, and most preferably 10 ppm or less. The lower limit of the content of the solvent not containing a fluorine atom is not limited, and the lower it is, the more preferable, but the lower limit may be, for example, 1 ppm or more.

The organic group in formula (1) may be an alkyl group, an alkoxy group, or a phenyl group.

The alkyl group and the alkoxy group preferably have 1 to 1000 carbon atoms, more preferably 1 to 600 carbon atoms, and further preferably 1 to 400 carbon atoms. When the number of carbon atoms is 2 or more, two carbon atoms may be linked via an amide bond, an imide bond, an ester bond, a urethane bond, a carbonate bond, an ether bond, or the like. Further, a part or all of the hydrogen atom bonded to a carbon atom may be replaced with a fluorine atom.

$R^1$ to $R^8$ may include a cyclic structure such as an aromatic ring. Further, $R^1$ to $R^8$ may include an amino group, a nitro group, a carboxyl group, a sulfo group, a hydroxyl group, a vinyl group, an epoxy group, a silyl group, an isocyanate group, and the like. The phenyl group may be substituted with one or more substituents.

In formula (1), at least one of $R^1$ to $R^8$ is preferably an organic group including a cyclic structure such as an aromatic ring, and more preferably all of $R^1$ to $R^8$ are organic groups including a cyclic structure such as an aromatic ring.

When $R^1$ to $R^8$ include a cyclic structure such as an aromatic ring, rigid structures are radially arranged at the apex of the cage-type silsesquioxane lattice, which imparts excellent heat resistance and plasma resistance to the cage-type silsesquioxane.

In formula (1), more preferably, at least one of $R^1$ to $R^8$ is an organic group including a divalent group represented by an alkylene group, an oxyalkylene group or —$C_6H_4$—NH— and a divalent to hexavalent benzene ring. When not all of $R^1$ to $R^8$ are such organic groups, $R^1$ to $R^8$ which are not the organic groups may be a hydrogen atom, a halogen atom, or a substituted or unsubstituted phenyl group. However, it is particularly preferable that all of $R^1$ to $R^8$ be organic groups including a divalent group represented by an alkylene group, an oxyalkylene group, or —$C_6H_4$—NH— and a divalent to hexavalent benzene ring. The benzene ring is preferably trivalent. The alkylene group and the oxyalkylene group may each have 1 to 10 carbon atoms, and preferably 1 to 5 carbon atoms.

The term "n-valent benzene ring" used herein means that n-number of hydrogen atoms of the benzene ring are replaced with other organic group.

The cage-type silsesquioxane may be either a dendrimer or a hyperbranched polymer, but from the viewpoint of ease of production and freedom of molecular design, it is preferably a hyperbranched polymer.

The cage-type silsesquioxane dendrimer has a cage-type silsesquioxane skeleton as a core and $R^1$ to $R^8$ as dendrons. The dendrimer is unimodal and does not have a molecular weight distribution. When the composition includes a cage-type silsesquioxane dendrimer, a molded article can be provided that has a small weight change against both fluorine-based plasma and oxygen plasma to which the article is exposed in the fabrication process of a semiconductor device. There is also an advantage in that the size of the molecule can be controlled based on the number of generations.

The cage-type silsesquioxane hyperbranched polymer usually has a molecular weight distribution and a molecular structure distribution. Hyperbranched polymers are much easier to synthesize than dendrimers (single molecular weight polymers that do not have a molecular weight distribution) that are regularly and completely dendritic from the core. The molecular weight distribution (Mw/Mn) of the cage-type silsesquioxane hyperbranched polymer may be 1 to 20, preferably 10 or less, more preferably 5 or less, and particularly preferably 3 or less, and preferably more than 1.

The molecular weight distribution can be determined by gel permeation chromatography analysis.

From the viewpoint of solubility, the hyperbranched polymer preferably has a number average molecular weight of 2,000 to 300,000. The hyperbranched polymer more preferably has a number average molecular weight of 4,000 to 100,000.

The number average molecular weight can be determined by gel permeation chromatography analysis.

The hyperbranched polymer has a highly branched molecular structure and is amorphous. It also has a large number of chain terminals into which functional groups can be introduced.

Compared with a dendrimer which is obtained by chemically reacting a monomer having a polyfunctional group step by step to form a regular branched structure (a structure having a plurality of branched chain portions with a core portion at the center), a hyperbranched polymer can be produced from a monomer in one go by polycondensation, and therefore is easier to produce and has a lower production cost.

Further, the number of branches can be controlled by appropriately adjusting the synthesis conditions, and molecular design according to the application can be easily carried out.

The hyperbranched polymer has a cage-type silsesquioxane skeleton as a core and $R^1$ to $R^8$ as hyperbranches. When the composition includes a cage-type silsesquioxane hyperbranched polymer, a molded article can be provided that has a small weight change against both fluorine-based plasma and oxygen plasma to which the article is exposed in the fabrication process of a semiconductor device. There is also an advantage in that the size of the molecule can be controlled by controlling the number of branches.

For the cage-type silsesquioxane, in formula (1), it is preferable that $R^1$ to $R^8$ be each independently an organic group including a terminal group T represented by formula (2):

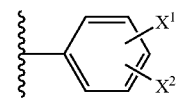

Formula (2)

wherein $X^1$ and $X^2$ are each independently —NH$_2$, —OH, —SH, —H, —NH—CO—CF$_3$, —NH—CO—Ar (Ar is a substituted or unsubstituted aryl group), a group (2-1) represented by the following formula:

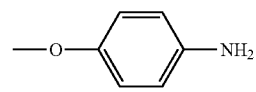

a group (2-2) represented by the following formula:

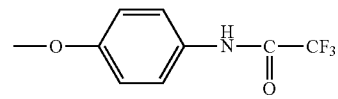

or a group (2-3) represented by the following formula:

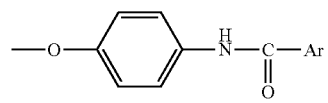

wherein Ar is a substituted or unsubstituted aryl group. Preferably, $X^1$ and $X^2$ are —NH$_2$, —NH—CO—Ar, or the group (2-3), and more preferably are —NH—CO—Ar or the group (2-3). When one or both of $X^1$ and $X^2$ are —NH—CO—Ar or the group (2-3), the cage-type silsesquioxane does not easily dissolve in alcohol, so that after the cage-type silsesquioxane is obtained by a synthesis reaction, the cage-type silsesquioxane can be washed with alcohol, enabling a high-purity cage-type silsesquioxane to be easily produced. As a result, a high-purity composition can be easily produced.

The group "Ar" in —NH—CO—Ar and the group (2-3) represents a substituted or unsubstituted aryl group. Ar is preferably an unsubstituted aryl group. Further, the aryl group is preferably a substituted or unsubstituted phenyl group, and more preferably an unsubstituted phenyl group.

Examples of the substituent of the aryl group include an alkyl group, an alkoxy group, an amino group, a nitro group, a carboxyl group, a sulfo group, a hydroxyl group, a vinyl group, an epoxy group, a silyl group, an isocyanate group, and the like. The alkyl group and the alkoxy group may be a non-fluorinated alkyl group, a fluorinated alkyl group, a fluorinated alkoxy group, or a non-fluorinated alkoxy group. The number of carbon atoms of the alkyl group and the alkoxy group is preferably 1 to 10. The substituent of the aryl group is preferably a fluorine atom-containing lower alkyl group having 1 to 10 carbon atoms, particularly 1 to 6 carbon atoms, such as —CF$_3$, —C$_2$F$_5$, —CH$_2$F, —CH$_2$CF$_3$, and —CH$_2$C$_2$F$_5$, and more preferably —CF$_3$. The number of substituents may be 1 or 2.

R$^1$ to R$^8$ are each preferably an organic group including a terminal group T represented by the following formula:

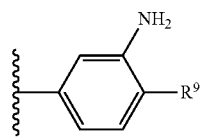

wherein each R$^9$ is the sane or different, and is —NH$_2$, —NHR$^{10}$, —OH, or —SH, and R$^{10}$ is a fluorine atom or a monovalent organic group.

Examples of the monovalent organic group for R$^{10}$ include an aliphatic hydrocarbon group, a phenyl group, and a benzyl group. Specifically, for example, at least one R$^{10}$ is preferably a lower alkyl group having 1 to 10 carbon atoms, particularly 1 to 6 carbon atoms, such as —CH$_3$, —C$_2$H$_5$, and —C$_3$H$_7$; a fluorine atom-containing lower alkyl group having 1 to 10 carbon atoms, particularly 1 to 6 carbon atoms, such as —CF$_3$, —C$_2$F$_5$, —CH$_2$F, —CH$_2$CF$_3$, and —CH$_2$C$_2$F$_5$; a phenyl group; a benzyl group; a phenyl group or benzyl group in which 1 to 5 hydrogen atoms are replaced with a fluorine atom, such as —C$_6$F$_5$, —CH$_2$C$_6$F$_5$; and a phenyl group or benzyl group in which 1 to 5 hydrogen atoms are replaced with —CF$_3$, such as —C$_6$H$_{5-n}$(CF$_3$)$_n$, and —CH$_2$C$_6$H$_{5-n}$(CF$_3$)$_n$ (n is an integer of 1 to 5).

Since cross-linking reactivity is good, R$^9$ is preferably —NH$_2$ or —OH, and more preferably —NH$_2$.

For the phenyl group of the terminal group T, when —NH$_2$ and R$^9$ are located at the ortho position, the cage-type silsesquioxane also acts as a cross-linking agent. Therefore, it is possible to provide a molded article having even better heat resistance and plasma resistance without using a general cross-linking agent like that described later.

The terminal group T is preferably a group represented by the formula:

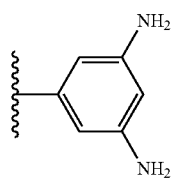

a group represented by the formula:

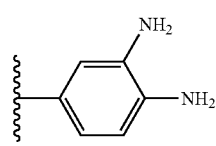 [SMILES: *c1ccc(N)c(N)c1]

a group represented by the formula:

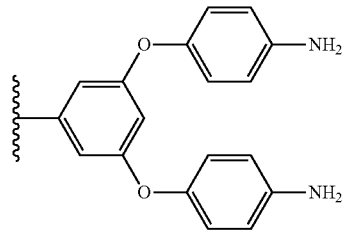 [SMILES: *c1cc(Oc2ccc(N)cc2)cc(Oc2ccc(N)cc2)c1]

or a group represented by the formula:

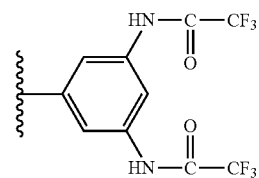 [SMILES: *c1cc(NC(=O)C(F)(F)F)cc(NC(=O)C(F)(F)F)c1]

Further, from the viewpoint that a high-purity composition can be easily produced, it is preferable that at least one of R$^1$ to R$^8$ be an organic group including a terminal group T represented by formula (3-1):

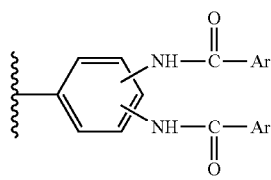

wherein each Ar is independently a substituted or unsubstituted aryl group), or formula (3-2):

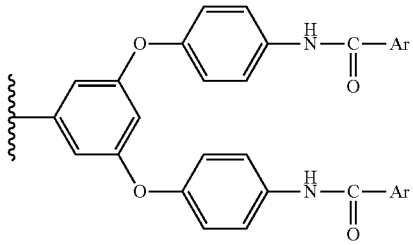

wherein each Ar is independently a substituted or unsubstituted aryl group). When not all of R$^1$ to R$^8$ are organic groups including a terminal group T represented by formula (3-1) or formula (3-2), R$^1$ to R$^8$ which are not the organic groups may be a hydrogen atom, a halogen atom, or a substituted or unsubstituted phenyl group (provided that those represented by formula (3-1) or formula (3-2) are excluded). More preferably, however, all of R$^1$ to R$^8$ are each an organic group including a terminal group T represented by formula (3-1) or formula (3-2).

The reason why a high-purity composition can be easily produced when the terminal group T is represented by formula (3-1) or formula (3-2) is that a cage-type silsesquioxane having an organic group including a terminal group T represented by formula (3-1) or formula (3-2) does not easily dissolve in alcohol, so that after the cage-type silsesquioxane is obtained by a synthesis reaction, the cage-type silsesquioxane can be washed with alcohol, enabling a high-purity cage-type silsesquioxane to be easily produced, and as a result, a high-purity composition can be easily produced.

Ar in formula (3-1) or formula (3-2) represents a substituted or unsubstituted aryl group. Ar is preferably an unsubstituted aryl group. Further, the aryl group is preferably a substituted or unsubstituted phenyl group, and more preferably an unsubstituted phenyl group.

Examples of the substituent of the aryl group include an alkyl group, an alkoxy group, an amino group, a nitro group, a carboxyl group, a sulfo group, a hydroxyl group, a vinyl group, an epoxy group, a silyl group, an isocyanate group, and the like. The alkyl group and the alkoxy group may be a non-fluorinated alkyl group, a fluorinated alkyl group, a fluorinated alkoxy group, or a non-fluorinated alkoxy group. The number of carbon atoms of the alkyl group and the alkoxy group is preferably 1 to 10. The substituent of the aryl group is preferably a fluorine atom-containing lower alkyl group having 1 to 10 carbon atoms, particularly 1 to 6 carbon atoms, such as —$CF_3$, —$C_2F_5$, —$CH_2F$, —$CH_2CF_3$, and —$CH_2C_2F_5$, and more preferably —$CF_3$. The number of substituents may be 1 or 2.

The terminal group T represented by formula (3-1) and formula (3-2) is preferably any of the following.

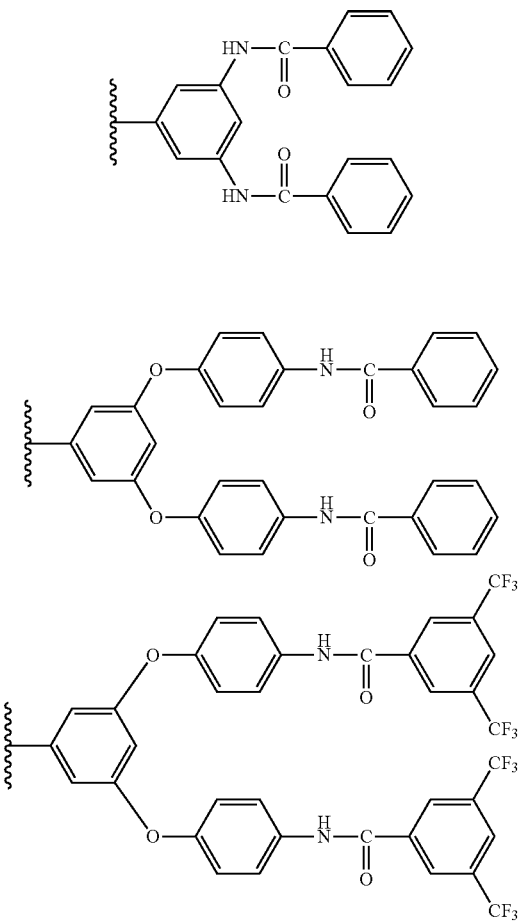

The third composition of the present disclosure is a composition comprising a fluorine-containing polymer and a silicon-containing compound, wherein the silicon-containing compound is a cage-type silsesquioxane in which at least one of $R^1$ to $R^8$ in formula (1) is an organic group including a terminal group T represented by formula (3-1) or formula (3-2). When not all of $R^1$ to $R^8$ are organic groups including a terminal group T represented by formula (3-1) or formula (3-2), $R^1$ to $R^8$ which are not the organic groups may be a hydrogen atom, a halogen atom, or a substituted or unsubstituted phenyl group (excluding those represented by formula (3-1) or formula (3-2)). More preferably, however, all of $R^1$ to $R^8$ are each an organic group including a terminal group T represented by formula (3-1) or formula (3-2).

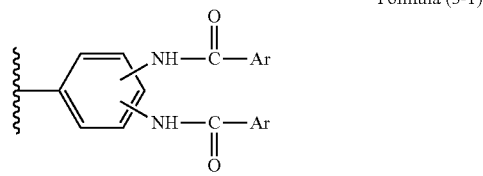

Formula (3-1)

wherein each Ar is independently a substituted or unsubstituted aryl group.

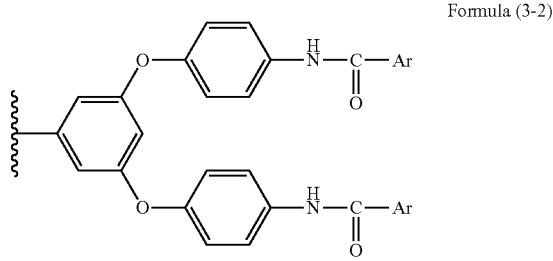

Formula (3-2)

wherein each Ar is independently a substituted or unsubstituted aryl group.

The third composition of the present disclosure contains the above-described cage-type silsesquioxane, and therefore a molded article can be provided that has excellent heat resistance and that has a small weight change against both fluorine-based plasma and oxygen plasma to which the article is exposed in a semiconductor fabrication process.

The third composition of the present disclosure further contains a cage-type silsesquioxane having an organic group including a terminal group T represented by formula (3-1) or formula (3-2). Therefore, even when high purity is required, the third composition of the present disclosure can be easily produced. The reason for this is because a cage-type silsesquioxane having an organic group including a terminal group T represented by formula (3-1) or formula (3-2) does not easily dissolve in alcohol, so that after the cage-type silsesquioxane is obtained by a synthesis reaction, the cage-type silsesquioxane can be washed with alcohol, enabling a high-purity cage-type silsesquioxane to be easily produced, and therefore a high-purity composition can be easily produced.

Other features of the cage-type silsesquioxane contained in the third composition of the present disclosure may be the same as those described above for the cage-type silsesquioxane contained in the first composition of the present disclosure.

The phosphorus content of the third composition of the present disclosure is preferably 20 ppm or less. When the phosphorus content is 20 ppm or less, even when the molded article obtained from the third composition of the present disclosure is used as a fluorine-containing polymer molded article used in a semiconductor fabrication process, phosphorous does not elute from the molded article and a high quality semiconductor device can be manufactured in a high yield.

The third composition of the present disclosure may also contain an amide solvent, but the content of the amide solvent is preferably less than 1000 ppm. By reducing the content of the amide solvent which remains in the third composition of the present disclosure, it is possible to efficiently produce a molded article while suppressing the occurrence of molding defects such as foaming caused by residual amide solvent. Further, even when the molded article obtained from the third composition of the present disclosure is used as a fluorine-containing polymer molded article used in a semiconductor fabrication process, residual amide solvent does not elute from the molded article and a high quality semiconductor device can be manufactured in a high yield.

Examples of the amide solvent include those given as examples of the amide solvent used for producing the silicon-containing compound such as a cage-type silsesquioxane. The amide solvent preferably does not contain a fluorine atom.

The content of the amide solvent in the third composition of the present disclosure is preferably 300 ppm or less, more preferably 60 ppm or less, and most preferably 10 ppm or less. The lower limit of the content of the amide solvent is not limited, and the lower it is, the more preferable, but the lower limit may be, for example, 1 ppm or more.

Further, the third composition of the present disclosure may contain a solvent not containing a fluorine atom, but the content of the solvent not containing a fluorine atom is preferably less than 1000 ppm. By reducing the content of the solvent not containing a fluorine atom which remains in the third composition of the present disclosure, it is possible to efficiently produce a molded article while suppressing the occurrence of molding defects such as foaming caused by the solvent not containing a fluorine atom remaining in the composition. In addition, even when the molded article obtained from the third composition of the present disclosure is used as a fluorine-containing polymer molded article used in a semiconductor fabrication process, the solvent not containing a fluorine atom does not elute from the molded article and a high quality semiconductor device can be manufactured in a high yield.

Examples of the solvent not containing a fluorine atom include those given as examples of the solvent used for producing the silicon-containing compound such as a cage-type silsesquioxane.

The content of the solvent not containing a fluorine atom in the third composition of the present disclosure is preferably 300 ppm or less, more preferably 60 ppm or less, and most preferably 10 ppm or less. The lower limit of the content of the solvent not containing a fluorine atom is not limited, and the lower it is, the more preferable, but the lower limit may be, for example, 1 ppm or more.

The cage-type silsesquioxane dendrimer used for the first, second, and third compositions of the present disclosure (in the present disclosure, sometimes referred to simply as "the composition of the present disclosure") may be a dendrimer in which $R^1$ to $R^8$ in formula (1) are organic groups including a trivalent group B represented by the following formula:

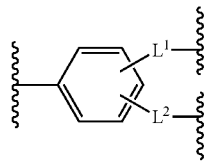

wherein $L^1$ and $L^1$ are each independently —NH—CO—, —O—CO—, —O—, —CO—, —OCH$_2$—, or a divalent group represented by the following formula:

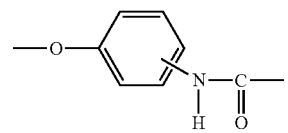

and preferably $L^1$ and $L^2$ are each independently —NH—CO— or a divalent group represented by the following formula:

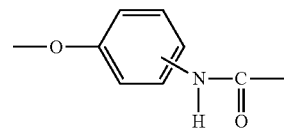

As the cage-type silsesquioxane dendrimer, all of $R^1$ to $R^8$ in formula (1) are preferably organic groups including the terminal group T and the trivalent group B. More preferably, all of $R^1$ to $R^8$ are organic groups in which the trivalent group B is bonded to the silicon atom of the cage-type silsesquioxane via a divalent group A represented by —(CH$_2$)$_l$—NH—CO— (l is an integer of 1 to 5), and further preferably, all of $R^1$ to $R^8$ are organic groups in which the trivalent group B is bonded to the silicon atom of the cage-type silsesquioxane via the divalent group A, and the terminal group T is bonded to the divalent group A via the trivalent group B. A plurality of trivalent groups B may be joined to form a regular repeating structure.

The number of generations of the cage-type silsesquioxane dendrimer may be 1 or more, but is preferably 2 or more, and more preferably 3 or more, and preferably 8 or less, and more preferably 6 or less.

The trivalent group B is preferably represented by formula (4-1) or formula (4-2).

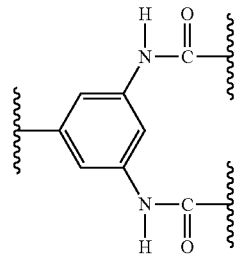

Formula (4-1)

Formula (4-2)

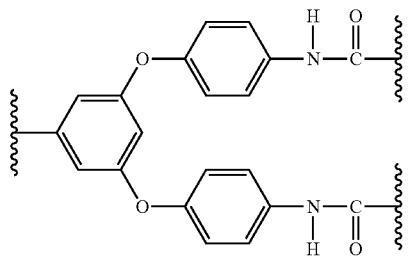

Further, the cage-type silsesquioxane hyperbranched polymer used for the composition of the present disclosure may be a hyperbranched polymer in which at least one of $R^1$ to $R^8$ in formula (1) is an organic group including a divalent group B1 represented by the following formula:

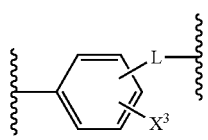

wherein L is —NH—CO—, —O—CO—, —O—, —CO—, —OCH$_2$—, or a divalent group represented by the following formula:

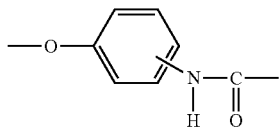

L is preferably —NH—CO— or a divalent group represented by the following formula:

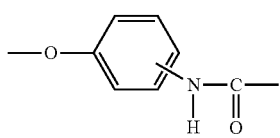

$X^3$ is as defined above for $X^1$ and $X^2$, and $X^3$ is preferably —NH$_2$, a group represented by the following formula:

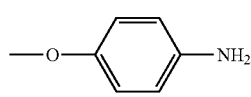

a group represented by the following formula:

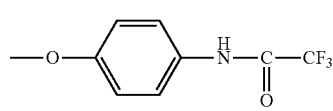

or a group represented by the following formula:

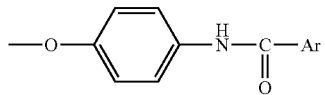

wherein Ar is a substituted or unsubstituted aryl group.

The divalent group B1 may be represented by the formulas (4-3) to (4-8).

Formula (4-3)

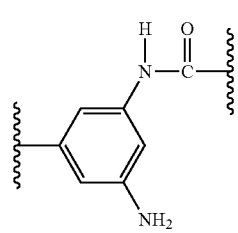

Formula (4-4)

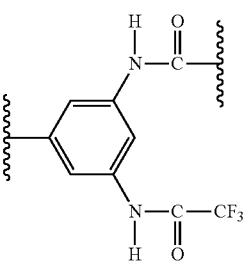

Formula (4-5)

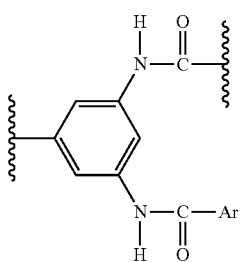

wherein Ar is a substituted or unsubstituted aryl group,

Formula (4-6)

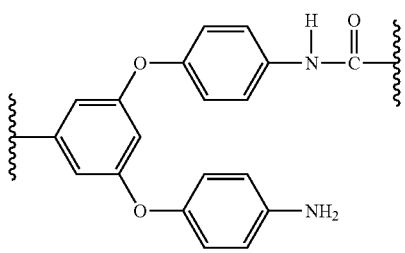

Formula (4-7)

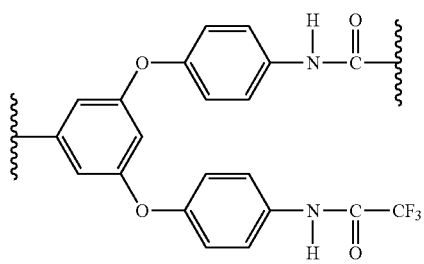

Formula (4-8)

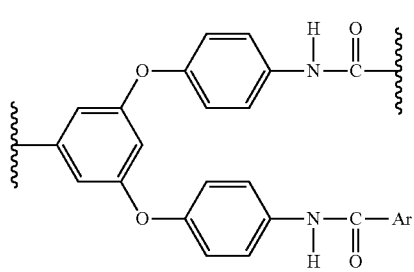

wherein Ar is a substituted or unsubstituted aryl group.

The cage-type silsesquioxane hyperbranched polymer is preferably a hyperbranched polymer in which at least one of $R^1$ to $R^8$ in formula (1) is an organic group including a trivalent group B2 represented by the following formula, and more preferably is a hyperbranched polymer in which all of $R^1$ to $R^8$ are organic groups including a trivalent group B2 represented by the following formula:

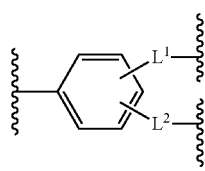

wherein each $L^1$ and $L^2$ is independently —NH—CO—, —O—CO—, —O—, —CO—, —OCH$_2$—, or a divalent group represented by:

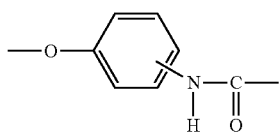

and $L^1$ and $L^2$ are preferably —NH—CO— or a divalent group represented b:

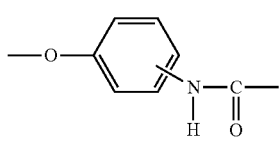

The trivalent group B2 is preferably represented by formula (4-9) or formula (4-10).

Formula (4-9)

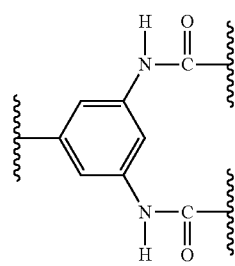

Formula (4-10)

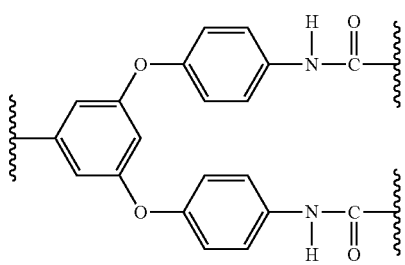

In the cage-type silsesquioxane hyperbranched polymer, the divalent group B1 or trivalent group B2 is preferably bonded to the silicon atom of the cage-type silsesquioxane via a divalent group A1 represented by the following formula:

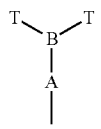

or a divalent group A2 represented by —(CH$_2$)$_l$—NH—CO— (l is an integer of 1 to 5), and more preferably the divalent group B1 or trivalent group B2 is bonded to the silicon atom of the cage-type silsesquioxane via the divalent group A1 or A2, and the terminal group T is bonded to the divalent group A1 or A2 via the divalent group B1 or trivalent group B2. A plurality of divalent groups B1 or trivalent groups B2 may be joined.

From the viewpoint of solubility, $R^1$ to $R^8$ preferably include 1 to 250 of the divalent group B1 and trivalent group B2 in total, and more preferably include 1 to 60 of them.

Examples of $R^1$ to $R^8$ include the following structures:

T—B—T
   |
   A
   |

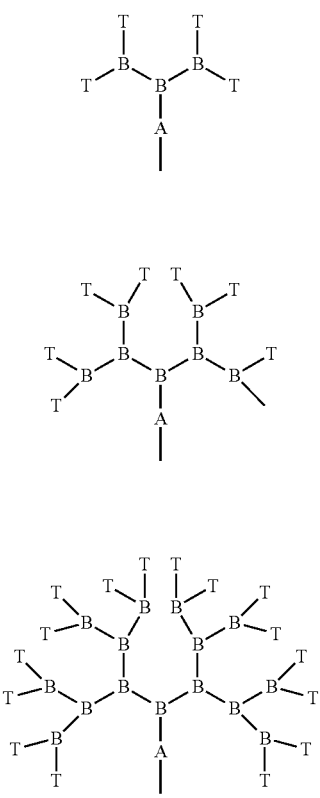

wherein A is A1 or A2 as defined above, and B is the trivalent group B2.

These structures are respectively the structures that the hyperbranches corresponding to the second to fifth generations have.

For example, the structure that the hyperbranch corresponding to the second generation has is as follows:

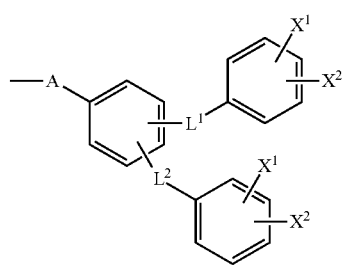

wherein A, $X^1$, $X^2$, $L^1$, and $L^2$ are as defined above.

The content of the silicon-containing compound is preferably 0.5 to 100 parts by mass, more preferably 5 to 50 parts by mass, and further preferably 5 to 25 parts by mass, with respect to 100 parts by mass of the fluorine-containing polymer. If the content of the silicon-containing compound is too low, the reinforcing property may be poor, and if the content of the silicon-containing compound is too high, the molded article to be obtained may be hard, and a sealing property may deteriorate.

The content of the cage-type silsesquioxane is preferably 0.5 to 100 parts by mass, more preferably 5 to 50 parts by mass, and further preferably 5 to 25 parts by mass with respect to 100 parts by mass of the fluorine-containing polymer. If the content of cage-type silsesquioxane is too low, the reinforcing property may be poor, and if the content of the cage-type silsesquioxane is too high, the molded article to be obtained may be hard and the sealing property may deteriorate.

The composition of the present disclosure contains a fluorine-containing polymer. The fluorine-containing polymer is preferably a fluorine-containing elastomer because it has an excellent sealing property, chemical resistance, and heat resistance.

In the present disclosure, the fluorine-containing elastomer is an amorphous fluorine-containing polymer. "Amorphous" refers to a state in which the melting peak ($\Delta H$) that appears in differential scanning calorimetry [DSC] (temperature-increasing rate 10° C./min) or differential thermal analysis [DTA] (temperature-increasing rate 10° C./min) of the fluorine-containing polymer is 4.5 J/g or less. Fluorine-containing elastomers exhibit elastomeric characteristics through cross-linking. "Elastomeric characteristics" means characteristics that allow the polymer to be stretched and to retain its original length when the force required to stretch the polymer is no longer applied.

The fluorine-containing elastomer may be a partially fluorinated elastomer or a perfluoroelastomer, but it is preferable to use a perfluoroelastomer from the viewpoint of having even better chemical resistance and heat resistance.

In the present disclosure, the partially fluorinated elastomer is a fluorine-containing polymer which includes a fluoromonomer unit, in which the content of a perfluoromonomer unit is less than 90 mol % with respect to all the polymerization units, and which has a glass transition temperature of 20° C. or lower and a melting peak ($\Delta H$) of 4.5 J/g or less.

In the present disclosure, the perfluoroelastomer is a fluorine-containing polymer in which the content of a perfluoromonomer unit is 90 mol % or more with respect to all the polymerization units, which has a glass transition temperature of 20° C. or lower and a melting peak ($\Delta H$) of 4.5 J/g or less, and in which the concentration of a fluorine atom in the fluorine-containing polymer is 71% by mass or more. In the present disclosure, the fluorine atom concentration in the fluorine-containing polymer is determined by calculating the concentration (% by mass) of the fluorine atoms included in the fluorine-containing polymer from the type and content of each monomer constituting the fluorine-containing polymer.

In the present disclosure, the perfluoromonomer is a monomer that does not include a carbon atom-hydrogen atom bond in the molecule. The perfluoromonomer may be a monomer in which, in addition to carbon atoms and fluorine atoms, some of the fluorine atoms bonded to carbon atoms are replaced with chlorine atoms, and may have, other than carbon atoms, a nitrogen atom, an oxygen atom, and a sulfur atom. The perfluoromonomer is preferably a monomer in which all the hydrogen atoms are replaced with fluorine atoms. A monomer that provides a crosslinking site does not fall within the scope of the perfluoromonomer.

Examples of the partially fluorinated elastomer include vinylidene fluoride (VdF)-based fluoroelastomers, tetrafluoroethylene (TFE)/propylene (Pr)-based fluoroelastomers, tetrafluoroethylene (TFE)/propylene/vinylidene fluoride (VdF)-based fluoroelastomers, ethylene/hexafluoropropylene (HFP)-based fluoroelastomers, ethylene/hexafluoropropylene (HFP)/vinylidene fluoride (VdF)-based fluoroelastomers, ethylene/hexafluoropropylene (HFP)/tetrafluoroethylene (TFE)-based fluoroelastomers, and the like. Among these, at least one selected from the group consisting of vinylidene fluoride-based fluoroelastomers and tetrafluoroethylene/propylene-based fluoroelastomers is preferable.

The vinylidene fluoride-based fluoroelastomer is preferably a copolymer comprising 45 to 85 mol % of vinylidene fluoride and 55 to 15 mol % of at least one other monomer copolymerizable with vinylidene fluoride. Preferably, the vinylidene fluoride-based fluoroelastomer is a copolymer comprising 50 to 80 mol % of vinylidene fluoride and 50 to 20 mol % of at least one other monomer copolymerizable with vinylidene fluoride.

In the present disclosure, the content of each monomer constituting the fluorine-containing polymer can be calculated by appropriately combining NMR, FT-IR, elemental analysis, and X-ray fluorescence analysis depending on the type of monomer.

Examples of the at least one other monomer copolymerizable with vinylidene fluoride include TFE, HFP, fluoroalkyl vinyl ether, chlorotrifluoroethylene (CTFE), trifluoroethylene, trifluoropropylene, pentafluoropropylene, trifluorobutene, tetrafluoroisobutene, hexafluoroisobutene, vinyl fluoride, a fluoromonomer represented by formula (11): $CHX^{11}=CX^{11}Rf^{11}$ wherein of two $X^{11}$, one is H and the other is F, and $Rf^{11}$ is a linear or branched fluoroalkyl group having 1 to 12 carbon atoms, and a fluoromonomer represented by formula (12): $CH_2=CH-(CF_2)_n-X^{12}$ wherein $X^{12}$ is H or F, and n is an integer of 3 to 10; a monomer that provides a crosslinking site; and a non-fluorinated monomer such as ethylene, propylene, and alkyl vinyl ether. These can be used alone or in any combination. Among these, it is preferable to use at least one selected from the group consisting of TFE, HFP, fluoroalkyl vinyl ether and CTFE.

The fluoroalkyl vinyl ether is preferably one selected from the group consisting of a fluoromonomer represented by formula (13):

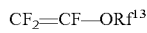

wherein $Rf^{13}$ represents a perfluoroalkyl group having 1 to 8 carbon atoms;

a fluoromonomer represented by formula (14):

wherein $Rf^{14}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms including 1 to 3 oxygen atoms; and a fluoromonomer represented by formula (15):

wherein $Y^{15}$ represents a fluorine atom or a trifluoroethyl group, M is an integer of 1 to 4, and n is an integer of 1 to 4. More preferably, the fluoroalkyl vinyl ether is a fluoromonomer represented by formula (13).

Specific examples of the vinylidene fluoride-based fluoroelastomer include a VdF/HFP-based rubber, a VdF/HFP/TFE-based rubber, VdF/CTFE-based rubber, a VdF/CTFE/TFE-based rubber, a VdF/fluoromonomer represented by formula (11)-based rubber, a VdF/fluoromonomer represented by formula (11)/TFE-based rubber, a VdF/perfluoro (methyl vinyl ether) [PMVE]-based rubber, a VdF/PMVE/TFE-based rubber, a VdF/PMVE/TFE/HFP-based rubber and the like. The VdF/fluoromonomer represented by formula (11)-based rubber is preferably a VdF/CH$_2$=CFCF$_3$-based rubber, and the VdF/fluoromonomer represented by formula (11)/TFE-based rubber is preferably VdF/TFE/CH$_2$=CFCF$_3$-based rubber.

The VdF/CH$_2$=CFCF$_3$-based rubber is preferably a copolymer comprising 40 to 99.5 mol % of VdF and 0.5 to 60 mol % of CH$_2$=CFCF$_3$, and more preferably 50 to 85 mol % of VdF and 15 to 50 mol % of CH$_2$=CFCF$_3$.

The tetrafluoroethylene/propylene-based fluoroelastomer is preferably a copolymer comprising 45 to 70 mol % of tetrafluoroethylene, 55 to 30 mol % of propylene, and 0 to 5 mol % of fluoromonomer that provides a crosslinking site.

The fluorine-containing elastomer may be a perfluoroelastomer. Examples of the perfluoroelastomer include at least one selected from the group consisting of a perfluoroelastomer including TFE, for example, a copolymer of TFE/fluoromonomer represented by formula (13), (14), or (15), and a copolymer of TFE/fluoromonomer represented by formula (13), (14), or (15)/monomer that provides a crosslinking site.

In the case of a TFE/PMVE copolymer, the compositional features thereof are preferably 45 to 90/10 to 55 (mol %), more preferably 55 to 80/20 to 45, and further preferably 55 to 70/30 to 45.

In the case of a copolymer of TFE/PMVE/monomer that provides a crosslinking site, the compositional features thereof are preferably 45 to 89.9/10 to 54.9/0.01 to 4 (mol %), more preferably 55 to 77.9/20 to 49.9/0.1 to 3.5, and further preferably 55 to 69.8/30 to 44.8/0.2 to 3.

In the case of a copolymer of TFE/fluoromonomer represented by formula (13), (14), or (15) having 4 to 12 carbon atoms, the compositional features thereof are preferably 50 to 90/10 to 50 (mol %), more preferably 60 to 88/12 to 40, and further preferably 65 to 85/15 to 35.

In the case of a copolymer of TFE/fluoromonomer represented by formula (13), (14), or (15) having 4 to 12 carbon atoms/monomer that provides a crosslinking site, the compositional features thereof are preferably 50 to 89.9/10 to 49.9/0.01 to 4 (mol %), more preferably 60 to 87.9/12 to 39.9/0.1 to 3.5, and further preferably 65 to 84.8/15 to 34.8/0.2 to 3.

If the compositional features of these copolymers are beyond these ranges, their nature as a rubber elastic body is lost, and the copolymer tends to have a nature close to that of a resin.

Examples of the perfluoroelastomer include at least one selected from the group consisting of a copolymer of TFE/fluoromonomer represented by formula (15)/monomer that provides a crosslinking site, a copolymer of TFE/fluoromonomer represented by formula (15), a copolymer of TFE/fluoromonomer represented by formula (13), and a copolymer of TFE/fluoromonomer represented by formula (13)/monomer that provides a crosslinking site.

Examples of the perfluoroelastomer may include the perfluoroelastomers described in International Publication No. WO 97/24381, Japanese Patent Publication No. 61-57324, Japanese Patent Publication No. 4-81608, Japanese Patent Publication No. 5-13961, and the like.

The monomer that provides a crosslinking site is a monomer (cure site monomer) having a crosslinkable group that provides a fluorine-containing polymer with a crosslinking site for forming a crosslink by a cross-linking agent.

Examples of the monomer that provides a crosslinking site include monomers represented by formula (16):

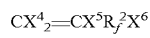

wherein $X^4$ and $X^5$ are each independently H, F, or an alkyl group having 1 to 5 carbon atoms, $R^2$ is a linear or branched alkylene group or oxyalkylene group which may have one or more ether-bonding oxygen atoms, which may have an aromatic ring, and in which a part or all of its hydrogen atoms may be replaced with fluorine atoms, and $X^6$ is an iodine atom, a bromine atom, a nitrile group, a carboxyl group, an alkoxycarbonyl group, a hydroxyl group, a vinyl group, an azide group, a sulfonyl azide group, a carbonyl azide group, or an alkyne group. The alkyne group may be an ethynyl group.

The monomer that provides a crosslinking site is preferably, from among the following, at least one selected from the group consisting of:

a fluoromonomer represented by formula (17):

$$CX^{16}{}_2=CX^{16}-Rf^{16}CHR^{16}X^{17}$$

wherein each $X^{16}$ is independently a hydrogen atom, a fluorine atom, or $CH_3$, $Rf^{16}$ is a fluoroalkylene group, a perfluoroalkylene group, a fluoro(poly)oxyalkylene group, or a perfluoro(poly)oxyalkylene group, $R^{16}$ is a hydrogen atom or $CH_3$, and $X^{17}$ is an iodine atom or a bromine atom;

a fluoromonomer represented by formula (18):

$$CX^{16}{}_2=CX^{16}-Rf^{17}X^{17}$$

wherein each $X^{16}$ is independently a hydrogen atom, a fluorine atom, or $CH_3$, $Rf^{17}$ is a fluoroalkylene group, a perfluoroalkylene group, a fluoro(poly)oxyalkylene group, or a perfluoro(poly)oxyalkylene group, and $X^{17}$ is an iodine atom or a bromine atom;

a fluoromonomer represented by formula (19):

$$CF_2=CFO(CF_2CF(CF_3)O)_n(CF_2)_n-X^{18}$$

wherein m is an integer of 0 to 5, n is an integer of 1 to 3, and $X^{18}$ is a cyano group, an azide group, a sulfonyl azide group, a carbonyl azide group, a carboxyl group, an alkoxycarbonyl group, an alkyne group, an iodine atom, a bromine atom, or $-CH_2I$;

a fluoromonomer represented by formula (20):

$$CH_2=CFCF_2O(CF(CF_3)CF_2O)_m(CF(CF_3))_n-X^{19}$$

wherein m is an integer of 0 to 5, n is an integer of 1 to 3, and $X^{19}$ is a cyano group, a carboxyl group, an alkoxycarbonyl group, an iodine atom, a bromine atom, or $CH_2OH$; and a monomer represented by formula (21):

$$CR^{20}{}_2=CR^{20}-Z-CR^{20}=CR^{20}{}_2$$

wherein each $R^{20}$ is independently a hydrogen atom or an alkyl group having 1 to 5 carbon atoms, and Z is a linear or branched alkylene group having 1 to 18 carbon atoms which may have an oxygen atom, a cycloalkylene group having 3 to 18 carbon atoms, an alkylene group or an oxyalkylene group having 1 to 10 carbon atoms which is at least partially fluorinated, or a (per)fluoropolyoxyalkylene group having a molecular weight of 500 to 10,000 and represented by $$-(Q)_p-CF_2O-(CF_2CF_2O)_m(CF_2O)_n-CF_2-(Q)_p-$$

wherein Q is an alkylene group or an oxyalkylene group, P is 0 or 1, and m/n is 0.2 to 5.

$X^{16}$ is preferably a fluorine atom. $Rf^{16}$ and $Rf^{17}$ are preferably a perfluoroalkylene group having 1 to 5 carbon atoms. $R^{16}$ is preferably a hydrogen atom. $X^{18}$ is preferably a cyano group, an alkoxycarbonyl group, an iodine atom, a bromine atom, or $-CH_2I$. $X^{19}$ is preferably a cyano group, an alkoxycarbonyl group, an iodine atom, a bromine atom, or $-CH_2OH$.

The monomer that provides the crosslinking site is preferably at least one selected from the group consisting of $CF_2=CFOCF_2CF(CF_3)OCF_2CF_2C$, $CF_2=CFOCF_2CF(CF_3)OCF_2CF_2COOH$, $CF_2=CFOCF_2CF(CF_3)$ $OCF_2CF_2CH_2I$, $CF_2=CFOCF_2CF_2CH_2I$, $CH_2=CFCF_2OCF(CF_3)CF_2OCF(CF_3)CN$, $CH_2=CFCF_2OCF(CF_3)CF_2F(CF_3)$ COOH, $CH_2=CFCF_2OCF(CF_3)CF_2OCF(CF_3)CH_2OH$, $CH_2=CHCF_2CF_2I$, $CH_2=CH(CF_2)_2CH=CH_2$, $CH_2=CH(CF_2)_6CH=CH_2$, and $CF_2=CFO(CF_2)_5CN_2$, and more preferably at least one selected from the group consisting of $CF_2=CFOCF_2CF(CF_3)OCF_2CF_2CN$ and $CF_2=CFOCF_2CF_2CH_2I$.

From the viewpoint of excellent compression set at high temperature, the fluorine-containing elastomer has a glass transition temperature of preferably −70° C. or higher, more preferably −60° C. or higher, and further preferably −50° C. or higher. Further, from the viewpoint of good cold resistance, the fluorine-containing elastomer has a glass transition temperature of preferably 5° C. or lower, more preferably 0° C. or lower, and further preferably −3° C. or lower.

The glass transition temperature is determined as follows: using a differential scanning calorimeter (DSC822e, manufactured by Mettler Toledo), a DSC curve is obtained by heating 10 mg of a sample at 10° C./min; and the temperature is read at the intermediate point of two intersections between each of the extension lines of the baselines before and after the secondary transition of the DSC curve and the tangent line at the inflection point of the DSC curve.

Fran the viewpoint of good heat resistance, the fluorine-containing elastomer has a Mooney viscosity ML (1+20) at 170° C. of preferably 30 or more, more preferably 40 or more, and further preferably 50 or more. Further, from the viewpoint of good processability, the fluorine-containing elastomer has a Mooney viscosity ML of preferably 150 or less, more preferably 120 or less, and further preferably 110 or less.

Fran the viewpoint of good heat resistance, the fluorine-containing elastomer has a Mooney viscosity ML (1+20) at 140° C. of preferably 30 or more, more preferably 40 or more, and further preferably 50 or more. Further, from the viewpoint of good processability, the fluorine-containing elastomer has a Mooney viscosity ML of preferably 180 or less, more preferably 150 or less, and further preferably 110 or less.

Fran the viewpoint of good heat resistance, the fluorine-containing elastomer has a Mooney viscosity ML (1+10) at 100° C. of preferably 10 or more, more preferably 20 or more, and further preferably 30 or more. Further, from the viewpoint of good processability, the fluorine-containing elastomer has a Mooney viscosity ML of preferably 120 or less, more preferably 100 or less, and further preferably 80 or less.

The Mooney viscosity can be measured at 170° C., 140° C., or 100° C. according to JIS K6300 by using a Mooney viscometer MV2000E manufactured by ALPHA TECHNOLOGIES.

The above-described partially fluorinated elastomer and perfluoroelastomer can be produced by a conventional method. However, from the viewpoint of a narrow molecular weight distribution of the obtained polymer, easy control of the molecular weight, and being able to introduce an iodine atom or a bromine atom to a terminal, an iodine compound or a bromine compound can also be used as a chain transfer agent. Examples of a polymerization method performed using an iodine compound or a bromine compound include a method in which emulsion polymerization is carried out in an aqueous medium under pressure in the presence of the iodine compound or the bromine compound in a substantially oxygen-free state (iodine transfer polymerization method). Typical examples of the iodine compound or bromine compound to be used include, for example, a compound represented by the formula:

$$R^{21}I_xBr_y$$

wherein x and y are each an integer of 0 to 2 and satisfy 1≤x+y≤2; and $R^{21}$ is a saturated or unsaturated fluorohydrocarbon group or chlorofluorocarbon group having 1 to 16 carbon atoms or a hydrocarbon group having 1 to 3 carbon atoms, which may contain an oxygen atom. By using an iodine compound or a bromine compound, an iodine atom or a bromine atom is introduced into the polymer to function as a cross-linking point.

Examples of the iodine compound and the bromine compound include 1,3-diiodoperfluoropropane, 2-iodoperfluoropropane, 1,3-diiodo-2-chloroperfluoropropane, 1,4-diiodoperfluorobutane, 1,5-diode-2,4-dichloroperfluoropentane, 1,6-diiodoperfluorohexane, 1,8-diiodoperfluorooctane, 1,12-diiodoperfluorododecane, 1,16-diiodineperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, a monoiodomonobromo-substituted benzene, a diiodomonobromo-substituted benzene, and a (2-iodoethyl)-substituted benzene and a (2-bromoethyl)-substituted benzene, and the like. These compounds can be used alone or in combination together.

Among these, it is preferable to use 1,4-diiodoperfluorobutane, 1,6-diiodoperfluorohexane, or 2-iodoperfluoropropane from the viewpoint of polymerization reactivity, cross-linking reactivity, availability, and the like.

The above-described fluoride-containing polymer preferably has a cyano group. In particular, when a cage-type silsesquioxane is used as a cross-linking agent, the fluorine-containing polymer preferably has a cyano group. When the fluorine-containing polymer has a cyano group, the cage-type silsesquioxane acts as a cross-linking agent in a more suitable manner, and further, a molded article having excellent heat resistance can be obtained.

The fluorine-containing polymer having a cyano group is preferably a fluorine-containing elastomer having a cyano group (—CN group) at a main chain terminal and/or in a side chain.

Examples of the fluorine-containing elastomer having a cyano group (—CN group) at a terminal of the main chain and/or in a side chain include a perfluoroelastomer and a partially fluorinated elastomer.

Examples of the perfluoroelastomer having a cyano group (—CN group) at a terminal of the main chain and/or in a side chain include, copolymers in which the monomer that provides a crosslinking site is a monomer having a cyano group (—CN group) among the above-described copolymers of TFE/fluoromonomer represented by formula (13), (14), or (15)/monomer that provides a crosslinking site. In this case, the content of the monomer unit having a cyano group (—CN group) may be 0.1 to 5 mol % with respect to the total amount of the TFE unit and the fluoromonomer unit represented by formula (13), (14), or (15), from the viewpoint of good crosslinking characteristics and heat resistance, and may even be 0.3 to 3 mol %. Even more preferable compositional features are as described above.

Further, examples of the monomer having a cyano group (—CN group) include monomers represented by the following formulas:

$$CY^1_2=Y^1(CF_2)_n-CN \quad \text{Formula:}$$

wherein each $Y^1$ is independently a hydrogen atom or a fluorine atom, and n is an integer of 1 to 8;

$$CF_2=CFCF_2Rf^8-CN \quad \text{Formula:}$$

wherein $Rf^8$ is $-(OCF_2)_n-$ or $-(OCF(CF_3))_n-$, and n is an integer of 0 to 5;

$$CF_2=CFCF_2(OCF(CF_3)CF_2)_m(OCH_2CF_2CF_2)_nOCH_2CF_2-CN \quad \text{Formula:}$$

wherein m is an integer of 0 to 5, and n is an integer of 0 to 5;

$$CF_2=CFCF_2(OCH_2CFCF_2)_m(OCF(CF_3)CF_2)_nOCF(CF_3)-CN \quad \text{Formula:}$$

wherein m is an integer of 0 to 5, and n is an integer of 0 to 5;

$$CF_2=CF(OCF_2CF(CF_3))_mO(CF_2)_n-CN \quad \text{Formula:}$$

wherein m is an integer of 0 to 5, and n is an integer of 1 to 8;

$$CF_2=CF(OCF_2CF(CF_3))_m-CN \quad \text{Formula:}$$

wherein m is an integer of 1 to 5;

$$CF_2=CFOCF_2(CF(CF_3)OCF_2)_nCF(-CN)CF_3 \quad \text{Formula:}$$

wherein n is an integer of 1 to 4;

$$CF_2=CFO(CF_2)_nOCF(CF_3)-CN \quad \text{Formula:}$$

wherein n is an integer of 2 to 5;

$$CF_2=CFO(CF_2)_n-(C_6H_4)-CN \quad \text{Formula:}$$

wherein n is an integer of 1 to 6;

$$CF_2=CF(OCF_2CF(CF_3))_nCF_2CF(CF_3)-CN \quad \text{Formula:}$$

wherein n is an integer of 1 to 2;

$$CH_2=CFCF_2O(CF(CF_3)CF_2O)_nCF(CF_3)-CN \quad \text{Formula:}$$

wherein n is an integer of 0 to 5;

$$CF_2=CFO(CF_2CF(CF_3)O)_m(CF_2)_n-CN \quad \text{Formula:}$$

wherein m is an integer of 0 to 5, and n is an integer of 1 to 3;

$$CH_2=CFCF_2OCF(CF_3)OCF(CF_3)-CN; \quad \text{Formula:}$$

$$CH_2=CFCF_2OCH_2CF_2-CN; \quad \text{Formula:}$$

$$CF_2=CFO(CF_2CF(CF_3)O)_mCF_2CF(CF_3)-CN \quad \text{Formula:}$$

wherein m is an integer of 0 or more;

$$CF_2=CFOCF(CF_3)CF_2O(CF_2)_n-CN \quad \text{Formula:}$$

wherein n is an integer of 1 or more; and $$CF_2=CFOCF_2OCF_2CF(CF_3)OCF_2-CN. \quad \text{Formula:}$$

These monomers can be used alone or in any combination.

Among the above, a monomer represented by the $$CF_2=CF(OCF_2CF(CF_3))_mO(CF_2)_n-CN \quad \text{formula:}$$

wherein m is an integer of 0 to 5, n is an integer of 1 to 8; and $CF_2=CFOCF_2CF(CF_3)OCF_2CF_2CN$ is more preferable.

These perfluoroelastomers can be produced by a conventional method.

Specific examples of the perfluoroelastomer may include the fluoroelastomers described in International Publication No. WO 97/24381, Japanese Patent Publication No. 61-57324, Japanese Patent Publication No. 4-81608, Japanese Patent Publication No. 5-13961, and the like.

Examples of the partially fluorinated elastomer having a cyano group (—CN group) at a terminal of the main chain and/or in a side chain include vinylidene fluoride (VdF)-based fluoroelastomers, tetrafluoroethylene (TFE)/propylene-based fluoroelastomers, tetrafluoroethylene (TFE)/propylene/vinylidene fluoride (VdF)-based fluoroelastomers, ethylene/hexafluoroethylene (HFP)-based fluoroelastomers, ethylene/hexafluoropropylene (HFP)/vinylidene fluoride (VdF)-based fluoroelastomers, ethylene/hexafluoropropylene (HFP)/tetrafluoroethylene (TFE)-based fluoroelastomers, fluorinesilicone-based fluoroelastomers, fluorophosphazene fluoroelastomers, and the like. These can each be used alone, or in any combination as long as the effects of the present disclosure are not impaired.

The vinylidene fluoride-based fluoroelastomer is a fluorine-containing copolymer comprising 45 to 85 mol % of vinylidene fluoride and 55 to 15 mol % of at least one other monomer copolymerizable with vinylidene fluoride. Preferably, the vinylidene fluoride-based fluoroelastomer is a fluorine-containing copolymer comprising 50 to 80 mol % of vinylidene fluoride and 50 to 20 mol % of at least one other monomer copolymerizable with vinylidene fluoride.

Examples of the at least one other monomer copolymerizable with vinylidene fluoride include a fluoromonomer such as TFE, CTFE, trifluoroethylene, HFP, trifluoropropylene, tetrafluoropropylene, pentafluoropropylene, trifluorobutene, tetrafluoroisobutene, perfluoro(alkyl vinyl ether) (PAVE), and vinyl fluoride, and non-fluorinated monomers such as ethylene, propylene and alkyl vinyl ether. These can be used alone or in any combination. Among these, TFE, HFP, and perfluoro(alkyl vinyl ether) are preferable.

Specific examples of the rubber include VdF-HFP-based rubber, VdF-HFP-TFE-based rubber, VdF-CTFE-based rubber, VdF-CTFE-TFE-based rubber, and the like.

These partially fluorinated elastomers can be produced by a conventional method.

Further, as the fluorine-containing elastomer, a thermoplastic fluoroelastomer comprising an elastomeric fluorine-containing polymer chain segment and a non-elastomeric fluorine-containing polymer chain segment may be used.

The cross-linking agent is not an essential component. However, the composition may further contain a cross-linking agent. Examples of the cross-linking agent include cross-linking agents used in peroxide crosslinking, polyol crosslinking, polyamine crosslinking, triazine crosslinking, oxazole crosslinking, imidazole crosslinking, and thiazole crosslinking. When the fluorine-containing polymer is a fluorine-containing elastomer having a cyano group (—CN group) at a terminal of a main chain and/or in a side chain, the cross-linking agent is preferably at least one selected from the group consisting of an oxazole cross-linking agent, an imidazole cross-linking agent, and a thiazole cross-linking agent.

The cross-linking agent used for peroxide crosslinking may be any organic peroxide that can easily generate a peroxy radical in the presence of heat or a redox system. Specific examples include 1,1-bis(t-butylperoxy)-3,5,5-trimethylcyclohexane, 2,5-dimethylhexane-2,5-dihydroperoxide, di-t-butyl peroxide (Perbutyl D), t-butylcumyl peroxide (Perbutyl C), dicumyl peroxide (Percumyl D, Percumyl D-40, Percumyl D-40 MB(T)), α,α-bis(t-butylperoxy)-p-diisopropylbenzene, 2,5-dimethyl-2,5-di(t-butylperoxy)hexane (Perhexa 25B, Perhexa 25B-40), 2,5-dimethyl-2,5-di(t-butylperoxy)hexyne-3 (Perhexyne 25B, Perhexyne 25B-40), benzoyl peroxide, t-butylperoxybenzene, 2,5-dimethyl-2,5-di(benzoylperoxy)hexane (Perhexa 25Z), t-butylperoxy maleate (t-butyl MA), t-butylperoxyisopropyl carbonate (Perbutyl I-75), methyl ethyl ketone peroxide (Permek D (DR), Permek H (HR, HY), Permek N (NR, NY), Permek S (SR), Permek F (FR), Permek G (GR, GY)), cyclohexanone peroxide (Perhexa H), acetylacetone peroxide (Percure AH, AL), 1,1-di(t-hexylperoxy)-3,3,5-trimethylcyclohexane (Perhexa TMH), 1,1-di(t-hexylperoxy)cyclohexane (Perhexa HC), 1,1-di(t-butylperoxy)-2-methyl cyclohexane (Perhexa MC), 1,1-di(t-butylperoxy) cyclohexane (Perhexa C-80(S), Perhexa C-75(EB), Perhexa C(C), Perhexa C-40, Perhexa C-40 MB(S)), 2,2-di(t-butylperoxy)butane (Perhexa 22), butyl 4,4-di-(t-butylperoxy) pentanoate (Perhexa V, Perhexa V-40 (F)), 2,2-di(4,4-di-(t-butylperoxy)cyclohexyl)propane (Pertetra A), p-menthane hydroperoxide (Permentha H), diisopropylbenzene hydroperoxide (Percumyl P), 1,1,3,3-tetramethylbutyl hydroperoxide (Perocta H), cumene hydroperoxide (Percumyl H-80), t-butyl hydroperoxide (Perbutyl H-69), di(2-t-butylperoxyisopropyl)benzene (Perbutyl P, Perbutyl P-40, Peroxymon F-40, Perbutyl P-40 MB(K)), di-t-hexyl peroxide (Perhexyl D), diisobutyryl peroxide (Peroyl IB), di(3,5,5-trimethylhexanoyl) peroxide (Peroyl 355(S)), dilauroyl peroxide (Peroyl L), disuccinic peroxide (Peroyl SA), a mixture of di-(3-methylbenzoyl) peroxide, benzoyl(3-methylbenzoyl) peroxide, and dibenzoyl peroxide (Nyper BMT-K40, Nyper INT-M), dibenzoyl peroxide (Nyper BW, Nyper BO, Nyper FF, Nyper BS, Nyper E, Nyper NS), di(4-methylbenzoyl) peroxide (Nyper PMB), di-n-propyl peroxydicarbonate (Peroyl NPP-50M), diisopropyl peroxydicarbonate (Peroyl IPP-50, Peroyl IPP-27), di(4-t-butylcyclohexyl) peroxydicarbonate (Peroyl TCP), di(2-ethylhexyl) peroxydicarbonate (Peroyl OPP), di-sec-butylperoxydicarbonate (Peroyl SBP), cumyl peroxyneodecanoate (Percumyl ND, Percumyl ND-50E), 1,1,3,3-tetramethylbutylperoxyneodecanoate (Perocta ND, Perocta ND-50E), t-hexyl peroxyneodecanoate (Perhexyl ND, Perhexyl ND-50E), t-butylperoxyneodecanoate (Perbutyl ND, Perbutyl ND-50E), t-butylperoxy neoheptanoate (Perbutyl NHP), t-hexylperoxy pivalate (Perhexyl PV, Perhexyl PV-50E), t-butylperoxy pivalate (Perbutyl PV, Perbutyl PV-40E), 1,1,3,3-tetramethylbutylperoxy-2-ethyl hexanoate (Perocta O), 2,5-dimethyl-2,5-di(2-ethylhexanoylperoxy)hexane (Perhexa 25 O), t-hexyl peroxy-2-ethyl hexanoate (Perhexyl O, Percure HO)(N)), t-butylperoxy-2-ethyl hexanoate (Perbutyl O, Percure O), t-hexyl peroxyisopropyl monocarbonate (Perhexyl I), t-butylperoxy-3,5,5-trimethyl hexanoate (Perbutyl 355), t-butylperoxy laurate (Perbutyl L), t-butylperoxy-2-ethylhexyl monocarbonate (Perbutyl E), t-hexyl peroxybenzoate (Perhexyl Z), t-butyl peroxyacetate (Perbutyl A), a mixture of t-butylperoxy-3-methyl benzoate and t-butylperoxy benzoate (Perbutyl ZT), t-butylperoxy benzoate (Perbutyl Z), t-butylperoxyallyl monocarbonate (peromer AC), 3,3',4,4'-tetra(t-butylperoxycarbonyl)benzophenone (BTTB-25), and 2,3-dimethyl-2,3-diphenylbutane (Nofmer BC-90). Preferred among these are dialkyl-type organic peroxides, and particularly preferred is 2,5-dimethyl-2,5-di(t-butylperoxy) hexane. Usually, the type and amount of the organic peroxide are selected in consideration of the amount of active —O—O—, the decomposition temperature, and the like.

Further, the cross-linking aid that can be used in this case may be a compound having a reactivity with a peroxy radical and a polymer radical. Examples thereof include polyfunctional compounds having a functional group such as —CH=CH$_2$, —CH$_2$CH=CH$_2$, —CF=CF$_2$, —C(CF$_3$)=CF$_2$, —C(CH$_3$)=CF$_2$, —CF=CF(CF$_3$), —CF=CF (CH$_3$), —C(C$_6$H$_5$)=CF$_2$, —CF=CF(C$_6$H$_5$), —CH=CF$_2$, —CF=CHF, —C(CF$_3$)=CHF, —CF=CH(CF$_3$), —CH=CF(CF$_3$) and the like wherein "C$_6$H$_5$" represents a phenyl radical. Specific examples thereof include triallyl cyanurate, triallyl isocyanurate (TAIC), triacryl formal, triallyl trimerite, N,N'-n-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine 2,4,6-trione), tris(diallylamine)-S-triazine, triallyl phosphite, N,N-diallylacrylamide, 1,6-divinyldodecafluorohexane, and the like.

Further, examples of a cross-linking aid used together with the peroxide cross-linking agent include a compound represented by formula (31):

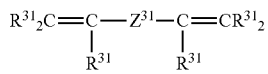

wherein each of the six $R^{31}$ is independently H, a halogen atom, or an optionally halogenated group having 1 to 5 carbon atoms in which an ether bond may be inserted, and $Z^{31}$ is an optionally halogenated linear or branched alkylene group or cycloalkylene group, or a (per) fluoropolyoxyalkylene group, each of which has 1 to 18 carbon atoms and optionally contains a hetero atom.

Examples of the compound represented by formula (31) include a compound represented by formula (32):

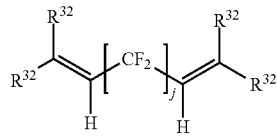

wherein j is an integer of 2 to 10, and preferably an integer of 4 to 8, and each of the four $R^{32}$ is independently H, F or an alkyl group or (per) fluoroalkyl group having 1 to 5 carbon atoms, a compound represented by formula (33):

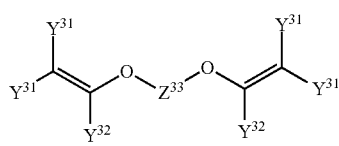

wherein each $Y^{31}$ is independently F, Cl, or H, each $Y^{32}$ is independently F, Cl, H, or OR$^{33}$, where $R^{33}$ is a branched or linear alkyl group that may be partially, substantially, or completely fluorinated or chlorinated, $Z^{33}$ is an optionally fluorinated divalent group having 2 to 10 carbon atoms in which an ether bond may be inserted, preferably $Z^{33}$ is a —(CF$_2$)$_n$— group in which m is an integer of 3 to 5, and the compound represented by formula (33) is preferably F$_2$C=CF—O—(CF$_2$)$_5$—O—CF=CF$_2$), and a compound represented by formula (34):

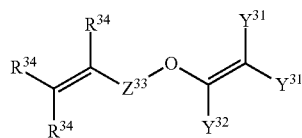

wherein $Y^{31}$, $Y^{32}$, and $Z^{33}$ are as defined above, and each $R^{34}$ is independently H, F, or an alkyl group or (per) fluoroalkyl group having 1 to 5 carbon atoms.

Examples of the cross-linking agent, or cross-linking aid used together with the peroxide cross-linking agent, include compounds having at least one structure represented by formula (35):

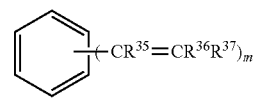

wherein $R^{35}$ to $R^{37}$ are each independently a hydrogen atom, a fluorine atom, an alkyl group, a fluorinated alkyl group, or a substituted or unsubstituted aryl group, and at least one of $R^{35}$ to $R^{37}$ is a fluorine atom or a group containing a fluorine atom; m is an integer of 1 to 5; when m is 2 or more, m-number of $R^{35}$ to $R^{37}$ may be the same or different with each other; and the hydrogen atoms of the benzene ring may be substituted. When m is 1, it is preferable to have two or more of the structures.

Examples of the compound having a structure represented by formula (36) include compounds represented by formula (36):

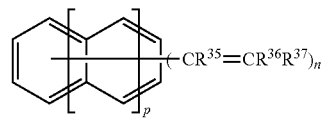

wherein $R^{35}$ to $R^{37}$ are as defined above; p is an integer of 0 to 2; and n is an integer of 2 to 6, compounds represented b formula (37):

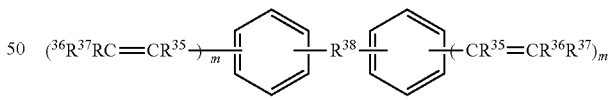

wherein $R^{35}$ to $R^{37}$ are as defined above, $R^{38}$ is a single bond, —SO$_2$—, —O—, —S—, —CO—, a heteroatom-containing group, a substituted or unsubstituted alkylene group, a substituted or unsubstituted cycloalkylene group or a substituted or unsubstituted arylene group, m is an integer of 1 to 5, and a part or all of these groups may be fluorinated.

The heteroatom-containing group is not limited as long as it is a divalent group containing a heteroatom. Examples of the heteroatom include an oxygen atom, a nitrogen atom, a sulfur atom, a boron atom, and a phosphorus atom.

Examples of the cross-linking agent used for polyol crosslinking include polyhydric alcohol compounds such as bisphenol A and bisphenol AF.

Examples of the cross-linking agent used for polyamine crosslinking include polyamine compounds such as hexamethylenediamine carbamate, N,N'-dicinenamiridene-1,6-hexanediamine, and 4,4'-bis(aminocyclohexyl)methane carbamate.

Examples of the cross-linking agent used for triazine crosslinking include organic tin compounds such as tetraphenyltin and triphenyltin.

Examples of the cross-linking agents used for oxazole crosslinking, imidazole crosslinking, and thiazole crosslinking include a bisdiaminophenyl-based cross-linking agent, a bis-aminophenol-based cross-linking agent, and a bis-aminothiophenol-based cross-linking agent represented by formula (41):

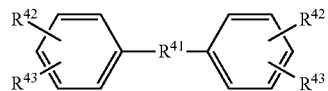

wherein $R^{41}$ is —$SO_2$—, —O—, —CO—, an alkylene group having 1 to 6 carbon atoms, a perfluoroalkylene group having 1 to 10 carbon atoms, a single bond, or a group represented by:

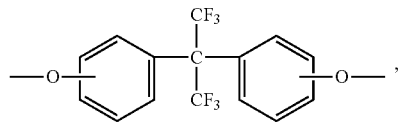

one of $R^{42}$ and $R^{43}$ is —$NH_2$ and the other is —$NHR^4$, —$NH_2$, —OH, or —SH, $R^{44}$ is a hydrogen atom, a fluorine atom, or a monovalent organic group, preferably $4^{42}$ is —$NH_2$ and $R^{43}$ is —$NHR^{44}$; preferred specific examples of the alkylene group having 1 to 6 carbon atoms include a methylene group, an ethylene group, a propylene group, a butylene group, a pentylene group, a hexylene group, and the like, and examples of the perfluoroalkylene group having 1 to 10 carbon atoms include:

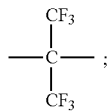

These compounds are known as examples of bisdiaminophenyl compounds in Japanese Patent Publication No. 2-59177, Japanese Patent Laid-Open No. 8-120146, and the like;

a bisamidrazone-based cross-linking agent represented by formula (42):

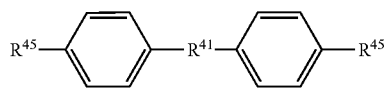

wherein $R^{41}$ is as defined above, and each $R^{45}$ is independently any one of the following groups:

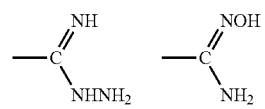

an amidrazone-based cross-linking agent represented by formula (43):

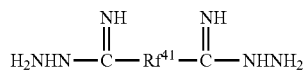

wherein $Rf^{41}$ is a perfluoroalkylene group having 1 to 10 carbon atoms; and a bisamidoxime-based cross-linking agent represented by formula (44):

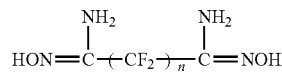

wherein n is an integer of 1 to 10, a compound represented by formula (45): $HN=CR^{45}R^{46}$, wherein $R^{45}$ is selected from the group consisting of H, $NH_2$, and $NHR^{47}$, $R^{46}$ is selected from the group consisting of Ph, $SO_2H$, $NR^{48}R^{49}$, 2-pyridine, and $CH_2CONH_2$, $R^{47}$ is selected from the group consisting of Ph, $NH_2$, and CN, $R^4$ is selected from the group consisting of H, NHPh, $CH_2CONH_2$, a linear alkyl group having 1 to 8 carbon atoms, and a branched alkyl group having 1 to 8 carbon atoms, and $R^{49}$ is selected from the group consisting of Ph, $COOC(CH_2)_3$, $NH_2$, $CH_2COOH$, $CSNH_2$, $CNHNH_3^+Cl^-$, p-phenyl CN,

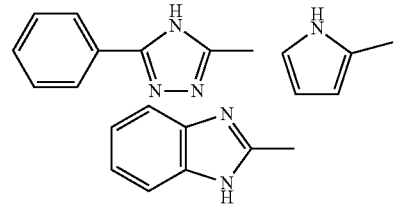

and COPh, and the like. These bisaminophenol-based cross-linking agents, bisaminothiophenol-based cross-linking agents, bisdiaminophenyl-based cross-linking agents, and the like have conventionally been used in crosslinking systems that use a cyano group as a crosslinking point, but these agents also react with a carboxyl group and an alkoxycarbonyl group to form an oxazole ring, a thiazole ring, and an imidazole ring to provide a crosslinked product.

Further, examples of the cross-linking agent include a cross-linking agent represented by formula (46): $X^{41}$—$(CH_2)_n$—$R^5$—$(CH_2)_m$—$X^{41}$, wherein each $X^{41}$ is independently an alkyne group, a nitrile group, or $Y^{41}_pN_3$, wherein $Y^{41}$ is SO, $SO_2$, $C_6H_4$, or CO, and p is 0 or 1, n and m are independently integers of 1 to 4, and $R^{50}$ is selected from the group consisting of i) a fluoroalkylene group having 3 to 10 carbon atoms,
ii) a fluoroalkoxylene group having 3 to 10 carbon atoms,
iii) a substituted arylene group, iv) an oligomer including a copolymerization unit of vinylidene fluoride and perfluoro(methylvinylether),
v) an oligomer including a copolymerization unit of vinylidene fluoride and hexafluoropropylene,
vi) an oligomer including a copolymerization unit of tetrafluoroethylene and perfluoro(methylvinylether), and
vii) an oligomer including a copolymerization unit of tetrafluoroethylene and a hydrocarbon olefin.

This cross-linking agent is preferably used together with a fluorine-containing elastomer having a nitrile group, an azide group, a sulfonyl azide group, a carbonyl azide group, or an alkyne group. For example, the nitrile group of the fluorine-containing elastomer reacts with the azide group of the cross-linking agent to form a tetrazole ring to provide a crosslinked product.

Examples of a particularly preferred cross-linking agent include a compound having a plurality of 3-amino-4-hydroxyphenyl groups or 3-amino-4-mercaptophenyl groups, or a compound represented by formula (47):

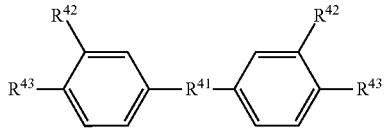

wherein $R^{41}$, $R^{42}$, and $R^{43}$ are as defined above. Specifically, examples include 2,2-bis(3-amino-4-hydroxyphenyl)hexafluoropropane (generic name: bis(aminophenol)AF), 2,2-bis(3-amino-4-mercaptophenyl)hexafluoropropane, tetraaminobenzene, bis-3,4-diaminophenylmethane, bis-3,4-diaminophenyl ether, 2,2-bis(3,4-diaminophenyl)hexafluoropropane, 2,2-bis[3-amino-4-(N-phenylamino)phenyl]hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-perfluorophenylamino)phenyl]hexafluoropropane, 2,2-bis[3-amino-4-(N-benzylamino)phenyl]hexafluoropropane, and the like.

Among these, the cross-linking agent is preferably 2,2-bis[3-amino-4-(N-phenylamino)phenyl]hexafluoropropane, from the point of heat resistance, steam resistance, amine resistance, and good crosslinkability.

The content of the cross-linking agent is preferably 0.05 to 10 parts by mass, and more preferably 0.5 to 5 parts by mass with respect to 100 parts by mass of the fluorine-containing polymer.

The above-described composition may contain a filler (provided that the above-described silicon-containing compound is excluded).

Examples of the filler (provided that the above-described silicon-containing compound is excluded) include an imide-based filler having an imide structure such as polyimide, polyamideimide, and polyetherimide, an organic filler made of engineering plastic such as polyarylate, polysulfone, polyethersulfone, polyphenylene sulfide, polyether ether ketone, polyether ketone, and polyoxybenzoate, a metal oxide filler such as aluminum oxide and yttrium oxide, a metal carbide such as aluminum carbide, a metal nitride filler such as aluminum nitride, an inorganic filler such as aluminum fluoride, carbon fluoride, and the like.

Among these, aluminum oxide, yttrium oxide, polyimide, and carbon fluoride are preferable from the viewpoint of a shield effect against various plasmas.

Further, the inorganic filler and organic filler may be used alone or blended in a combination of two or more thereof.

The amount of the filler (provided that the above-described silicon-containing compound is excluded) to be blended is preferably 0.5 to 100 parts by mass, and more preferably 5 to 50 parts by mass, with respect to 100 parts by mass of the fluorine-containing polymer.

Especially in fields not requiring high purity and non-contamination properties, an ordinary additive that is blended in the fluorine-containing polymer composition, such as a filler, a processing aid, a plasticizer, and a colorant, can optionally be blended. One or more camion cross-linking agents and cross-linking aids different from those described above may also be blended.

The composition may contain an organic basic compound. Examples of the organic basic compound include an octadesylamine of formula: $CH_3(CH_2)_{17}-NH_2$; an erucamide of formula: $H_2N-C(O)-(CH_2)_n-CH=CH-(CH_2)_7CH_3$; an oleamide of formula: $H_2N-C(O)-(CH_2)_7-CH=CH-(CH_2)_7CH_3$; a hexamethylenediamine of formula: $H_2N-(CH_2)_6-NH_2$; and a 1,8-diazabicycloundec-7-en (DBU) of formula:

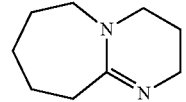 [SMILES: C1CCC2=NCCCN2CC1]

and the like.

The composition and the fluorine-containing polymer contained in the composition are preferably produced substantially in the absence of a metal compound as a raw material. The metal content of the composition is preferably 100 ppm or less, more preferably 50 ppm or less, and further preferably 10 ppm or less. An extremely low metal content of the composition is preferable because a molded article is obtained that can be used in a semiconductor fabrication process or a pharmaceutical manufacturing process in which contamination by metal components should be avoided. The metal content can be measured by flameless atomic absorption spectrophotometry or high frequency inductively coupled plasma emission spectroscopy. The metal content in the present disclosure is the total metal content of Fe, Cr, Ni, Cu, Al, Na, Mg, Ca, Zn, Ba, and K. As the metal content of the composition, the total of the content of these metals and the content of metals other than these metals may be within the above range.

The composition can be prepared by mixing each of the above-described components by using an ordinary polymer processing machine, for example, an open roll, a Banbury mixer, a kneader, or the like. In addition, the composition of the present disclosure can also be prepared by a method using a closed mixer. The composition can be suitably used as a molding material for obtaining a molded article by molding, and can also be suitably used as a molding material for obtaining a molded article by crosslinking and molding.

The method for obtaining a preform by using the composition as a molding material may be an ordinary method, and can be performed by a known method such as a method of heating and compressing in a mold, a method of press-fitting into a heated mold, and a method of extruding with an extruder. In the case of an extruded product such as a hose and an electric wire, the molded article can be obtained by heating and crosslinking with steam or the like after extrusion.

The above-described crosslinking can be performed in the order of primary crosslinking and secondary crosslinking. The primary crosslinking is preferably carried out at 150 to 200° C. for 5 to 120 minutes, and more preferably at 170 to 190° C. for 5 to 60 minutes. As the crosslinking means, known crosslinking means may be used, and examples thereof include press-crosslinking.

The secondary crosslinking is preferably carried out at 250 to 320° C. for 2 to 24 hours, and more preferably at 280 to 310° C. for 5 to 20 hours. As the crosslinking means, known crosslinking means may be used, and examples thereof include oven crosslinking.

The molded article of the present disclosure is obtained from the above-described composition. When the molded article of the present disclosure comprises the above-described cage-type silsesquioxane as the silicon-containing compound, a molded article can be provided that has excellent heat resistance and that has a small weight change against both fluorine-based plasma and oxygen plasma to which the article is exposed in a semiconductor fabrication process.

Moreover, according to the first composition of the present disclosure, it is also possible to obtain a molded article having a phosphorus content of 20 ppm or less. Further, according to the second composition of the present disclosure, molding defects such as foaming caused by residual amide solvent are suppressed, and it is also possible to obtain a molded article in which the adverse impact of residual amide solvent is also suppressed. In addition, according to the third composition of the present disclosure, it is possible to easily produce a high-purity molded article. Therefore, the molded article of the present disclosure is useful as a fluoride-containing polymer molded article used in a semiconductor fabrication process. When the molded article of the present disclosure is used as a molded article used in a semiconductor fabrication process, impurities such as phosphorus and amide solvent do not elute from the molded article, and a high quality semiconductor device can be manufactured in a high yield.

Therefore, the molded article of the present disclosure can be suitably used as a sealing material for a semiconductor fabrication apparatus that particularly requires heat resistance, in particular a semiconductor fabrication apparatus in which high-density plasma irradiation is performed. Examples of the sealing material include O-rings, square-rings, gasket, packing, oil seals, bearing seals, lip seals, and the like.

In addition, the molded article of the present disclosure can also be used as various polymer products used in semiconductor fabrication apparatus, such as diaphragms, tubes, hoses, various rubber rolls, and belts. Further, the molded article of the present disclosure can also be used as a coating material and a lining material.

As referred to herein, the "semiconductor fabrication apparatus" is not particularly limited to an apparatus for fabricating semiconductors, and widely includes general fabrication apparatus used in the semiconductor field requiring a high level of cleanliness, such as apparatus for manufacturing liquid crystal panels and plasma panels. Examples thereof include the following.

(1) Etching apparatus
  Dry etching apparatus
  Plasma etching apparatus
  Reactive ion etching apparatus
  Reactive ion beam etching apparatus
  Sputter etching apparatus
  Ion beam etching apparatus
  Wet etching apparatus
  Ashing apparatus
(2) Cleaning apparatus dry etching cleaning apparatus
  UV/$O_3$ cleaning apparatus
  Ion beam cleaning apparatus
  Laser beam cleaning apparatus
  Plasma cleaning apparatus
  Gas etching cleaning apparatus
  Extraction and cleaning apparatus
  Soxhlet extraction cleaning apparatus
  High-temperature high-pressure extraction cleaning apparatus
  Microwave extraction cleaning apparatus
  Supercritical extraction cleaning apparatus
(3) Exposure apparatus
  Stepper
  Coater/developer
(4) Polishing apparatus
  CMP apparatus
(5) Film formation apparatus
  CVD apparatus
  Sputtering apparatus
(6) Diffusion/ion implantation apparatus
  Oxidation diffusion apparatus
  Ion implantation apparatus The molded article of the present disclosure exhibits excellent performance as a sealing material for, for example, a CVD apparatus, a plasma etching apparatus, a reactive ion etching apparatus, an ashing apparatus, and an excimer laser exposure machine.

Embodiments have been described above, but it will be understood that various modifications to the modes and details may be made without departing from the spirit and scope of the claims.

EXAMPLES

Next, synthesis examples and preparation examples of the embodiments of the present disclosure will be described with reference to Examples, but the present disclosure is not limited to only these Examples.

The numerical values in the examples were measured by the following methods.

<Molecular Weight, Molecular Weight Distribution>

The molecular weight and molecular weight distribution were measured by gel permeation chromatography (column: TSKgel GMHHR-M, manufactured by Tosoh Corporation) as standard polystyrene conversion values.

<Phosphorus Content>

The fluorine-containing elastomer composition was molded into a sheet, and then the phosphorus content was measured by X-ray fluorescence analysis. The quantification limit in this measurement method was 20 ppm.

<Solvent Content>

The hyperbranched polymer was dissolved in a solvent for sample preparation, and a chromatogram of the hyperbranched polymer was obtained using gas chromatography (Colum: Rtx-5 Amine, manufactured by RESTEK).

A calibration curve was drawn for the solvents such as NMP and DMAc used in the synthesis.

Based on the calibration curve, the content of the solvent used for the synthesis of the hyperbranched polymer and the content of the solvent in the hyperbranched polymer were calculated.

The quantification limit of this measurement method was 1 ppm.

Production Example 1

Into a stainless steel autoclave having an internal volume of 6 liters and having no ignition source, 2.3 liters of pure water, 23 g of emulsifier ($C_3F_7CF(CF_3)CF_2OCF(CF_3)COONH_4$), and 0.2 g of ammonium carbonate as a pH adjuster were charged. The system was thoroughly purged with nitrogen gas and degassed, and then while stirring at 600 rpm, the temperature was raised to 50° C., and tetrafluoroethylene (TFE) and perfluoro(methyl vinyl ether) (PMVE) were added in a TFE/PMVE=24/76 (molar ratio) so that the internal pressure was 0.8 MPa. Then, 0.8 g of $CF_2=CFOCF_2CF(CF_3)OCF_2CF_2CN$ (CNVE) was introduced under nitrogen pressure. The reaction was started by introducing 10 mL of an 1.2 g/mL aqueous solution of ammonium persulfate (APS) under nitrogen pressure.

When the internal pressure dropped to 0.7 MPa due to the progression of polymerization, 12 g of TFE and 13 g of PMVE were introduced each under their own pressure. Then, as the reaction progressed, TFE and PMVE were introduced in the same manner, and the pressure was increased and decreased repeatedly between 0.7 and 0.9 MPa, and 1.5 g of CNVE for every 80 g of additionally added TFE and PMVE was introduced under nitrogen pressure.

When the total amount added of TFE and PMVE reached 680 g, the autoclave was cooled, and unreacted monomers were released to obtain 3110 g of an aqueous dispersion having a solid component concentration of 22% by mass.

3110 g of this aqueous dispersion were diluted with 3730 g of water, and the resultant mixture was slowly added while stirring into 3450 g of a 4.8% by mass aqueous solution of nitric acid. After stirring for 30 minutes after the addition, the coagulated product was filtered off, the obtained polymer was washed with water and then vacuum dried to obtain 680 g of a fluorine-containing elastomer.

The results of $^{19}F$-NM analysis showed that the monomer unit compositional features of the obtained fluorine-containing elastomer were TFE/PMVE/CNVE=59.3/39.9/0.8 (mol %). Measurement by infrared spectroscopic analysis showed that the characteristic absorption of the carboxyl group was observed near 1774.9 $cm^{-1}$ and 1808.6 $cm^{-1}$, and the characteristic absorption of the OH group was observed near 3557.5 $cm^{-1}$ and 3095.2 $cm^{-1}$.

Further, the metal content of the obtained fluorine-containing elastomer was measured using the measurement method described in International Publication No. 94/28394. Specifically, a predetermined amount of a sample including the metal to be quantified was incinerated in a cuvette under ashing conditions including an ashing temperature of about 1000° C. and an ashing time of about 240 seconds, and then the absorbance of the ashed sample was measured with a flameless atomic absorption spectrophotometer. The metal content of the obtained fluorine-containing elastomer was 10 ppm or less.

Synthesis Example 1 (Production of Hyperbranched Polymer)

A POSS having an amino group was synthesized in accordance with the procedure represented by the following formula with reference to the method described in Polymer, 2003, 44, 4491-4499.

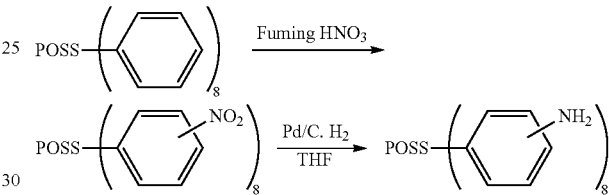

The obtained POSS having an amino group is a compound in which in the above formula (1) $R^1$ to $R^8$ are $-CH_4-NH_2$.

Then, the following reaction was carried out using the POSS having an amino group to obtain a hyperbranched polymer. In the formula, n is determined based on the number of generations, the molecular weight, and the molecular weight distribution of the hyperbranched polymer. Further, the lengths of the eight (i.e., the number of n) strands that bind to the core POSS are the same or different. The molecular weight distribution of the hyperbranched polymer is determined based on the distribution of n in the same molecule and the distribution of n in all the molecules.

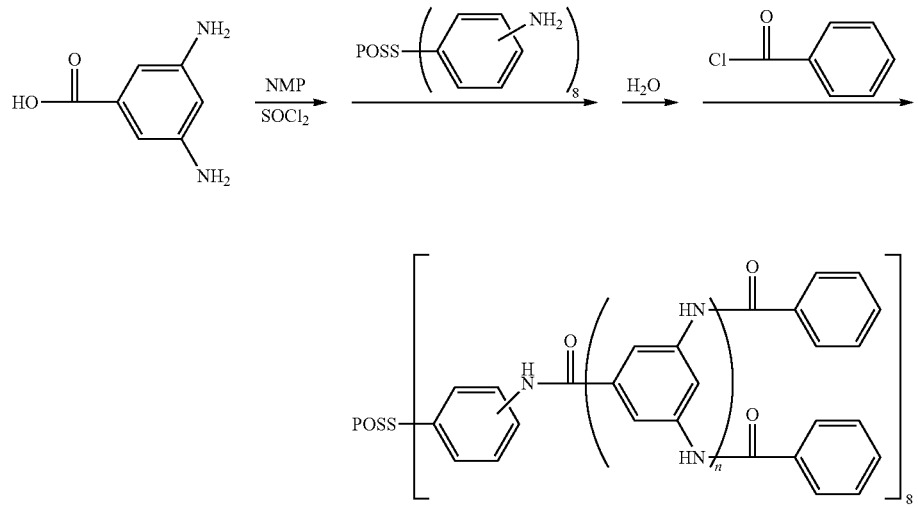

First, in the manner shown in the above reaction mechanism, 10 mL of N-methyl-2-pyrrolidone (NMP) and 3.49 g (29.3 mmol) of $SOCl_2$ were mixed at 0° C. and stirred for 10 minutes. 1.35 g (8.89 mmol) of 3,5-diaminobenzoic acid dissolved in 25 mL of NMP was added thereto, and the mixture was stirred at 0° C. for 20 minutes. Then, 0.183 g (0.159 mmol) of the POSS having an amino group dissolved in 5 mL of NMP was added, and the mixture was stirred at 0° C. for 30 minutes. To the resultant mixture, 0.192 g (10.7 mmol) of water was added, and the mixture was stirred at 0° C. for 10 minutes and then at room temperature for 6 hours. Then, 4.28 g (30.4 mmol) of benzoyl chloride was added, and the mixture was stirred at room temperature for 90 minutes. The reaction solution was charged into a 3% aqueous solution of sodium carbonate, and the precipitated solid was collected. The obtained solid was charged into 2-propanol, washed, then collected and dried under reduced pressure at 80° C. The yield was 99%. The obtained hyperbranched polymer corresponded to a third generation, and had a weight average molecular weight (Mw) of 19,400 and a molecular weight distribution (Mw/Mn) of 1.6.

Synthesis Example 2 (Production of Hyperbranched Polymer)

A hyperbranched polymer was obtained using the POSS having an amino group and carrying out the following reaction.

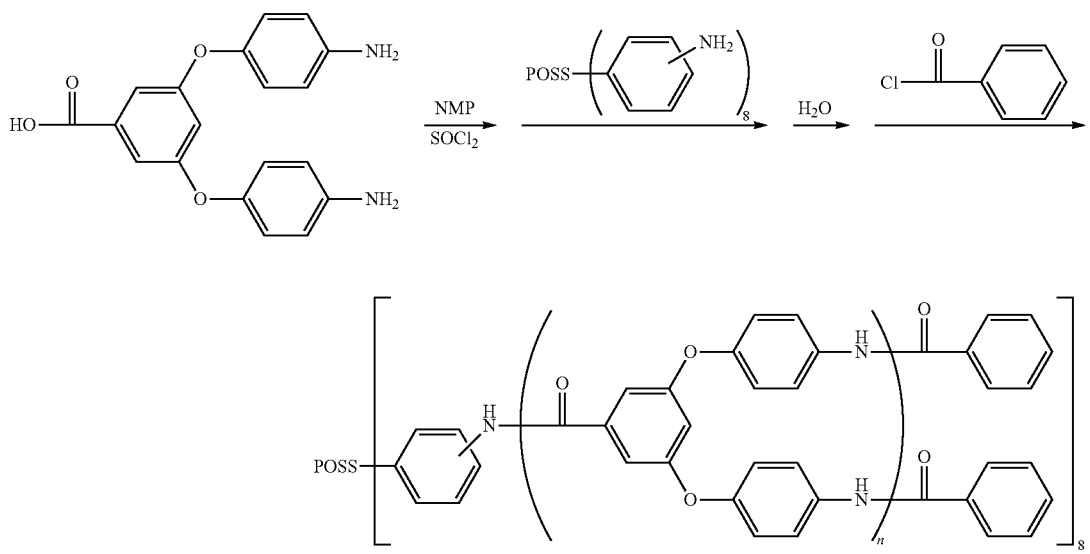

First, in the manner shown in the above reaction mechanism, 20 mL of NMP and 2.60 g (21.8 mmol) of $SOCl_2$ were mixed at 0° C. and stirred for 10 minutes. 1.88 g (5.60 mmol) of 3,5-bis(4-aminophenoxy)benzoic acid dissolved in 30 mL of NMP was added thereto, and the mixture was stirred at 0° C. for 20 minutes. Then, 0.269 g (0.233 mmol) of the POSS having an amino group dissolved in 10 mL of NMP was added, and the mixture was stirred at 0° C. for 30 minutes. To the resultant mixture, 0.202 g (11.2 mmol) of water was added, and the mixture was stirred at roan temperature for 3 hours. Then, 0.0908 g (5.04 mmol) of water was added, the mixture was stirred at roam temperature for 10 minutes, then 3.15 g (22.4 mmol) of benzoyl chloride was added, and the mixture was stirred at roam temperature for 90 minutes. The reaction solution was charged into a 3% aqueous solution of sodium carbonate, and the precipitated solid was collected. The obtained solid was charged into methanol, washed, then collected and dried under reduced pressure at 80° C. The yield was 90%. The obtained hyperbranched polymer corresponded to a second generation, and had a weight average molecular weight (Mw) of 21, 500 and a molecular weight distribution (Mw/Mn) of 1.6.

Synthesis Example 3 (Production of Hyperbranched Polymer)

A hyperbranched polymer was obtained using the POSS having an amino group and carrying out the following reaction.

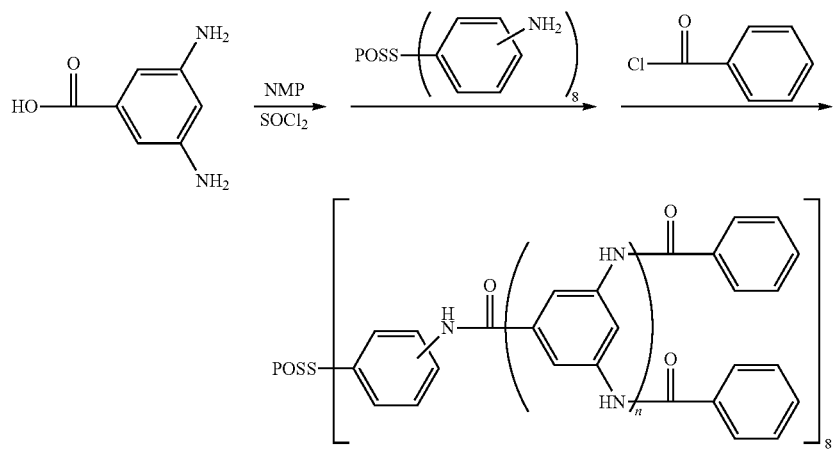

First, in the manner shown in the above reaction mechanism, 5 mL of NMP and 4.76 g (40.0 mmol) of SOCl$_2$ were mixed at 0° C. and stirred for 10 minutes. 1.35 g (8.89 mmol) of 3,5-diaminobenzoic acid dissolved in 10 mL of NMP was added thereto, and the mixture was stirred at 0° C. for 20 minutes. Then, 0.183 g (0.159 mmol) of the POSS having an amino group dissolved in 5 mL of NMP was added, and the mixture was stirred at 0° C. for 30 minutes and then at 60° C. for 3 hours. To the resultant mixture, 4.28 g (30.4 mmol) of benzoyl chloride was added, and the mixture was stirred at 60° C. for 90 minutes. The reaction solution was charged into a 3% aqueous solution of sodium carbonate, and the precipitated solid was collected. The obtained solid was charged into 2-propanol, washed, then collected and dried under reduced pressure at 80° C. The yield was 100%. The obtained hyperbranched polymer corresponded to a third generation, and had a weight average molecular weight (Mw) of 27,000 and a molecular weight distribution (Mw/Mn) of 3.9.

Synthesis Example 4 (Production of Hyperbranched Polymer)

A hyperbranched polymer was obtained in the same manner as in Synthesis Example 2, except that the conditions for the drying under reduced pressure were changed to 200° C. for 3 hours. The yield was 93%. The obtained hyperbranched polymer corresponded to a second generation, and had a weight average molecular weight (Mw) of 26,900 and a molecular weight distribution (Mw/Mn) of 1.1. The content of residual NMP of the obtained hyperbranched polymer determined by gas chromatography was 101 ppm, and the content of residual DMAc was below the detection limit (less than 1 ppm).

The content of residual NMP of the hyperbranched polymer obtained in Synthesis Example 2 was 13,183 ppm.

Synthesis Example 5 (Production of Hyperbranched Polymer)

A hyperbranched polymer was obtained in the same manner as in Synthesis Example 2, except that the solvent mixed with the SOCl$_2$ was changed from NMP to DMAc, and the conditions for the drying under reduced pressure were changed to 200° C. for 3 hours. The content of residual NMP of the obtained hyperbranched polymer determined by gas chromatography was 20 ppm, and the content of residual DMAc was 40 ppm.

Synthesis Example 6 (Production of Hyperbranched Polymer)

A hyperbranched polymer was obtained in the same manner as in Synthesis Example 2, except that the solvent mixed with the SOCl$_2$, the solvent for dissolving the 3,5-bis(4-aminophenoxy)benzoic acid, and the solvent for dissolving the POSS having an amino group were changed from NMP to DMAc, the amounts thereof were changed by a factor of 10, and the conditions for the drying under reduced pressure were changed to 200° C. for 3 hours. The content of residual NMP of the obtained hyperbranched polymer determined by gas chromatography was and below the detection limit (less than 1 ppm), and the content of residual DMAc was 280 ppm.

As described above, in Synthesis Examples 1 to 6, a high-purity hyperbranched polymer could be obtained by washing the collected solid with alcohol. Further, in Synthesis Examples 1 to 6, the hyperbranched polymer did not dissolve in alcohol even when washed with alcohol, and the hyperbranched polymer could be obtained in a high yield.

Preparation Example 1

A fluorine-containing elastomer composition was obtained by kneading 10 parts by mass of the hyperbranched polymer obtained in Synthesis Example 3 and 0.8 parts by mass of a cross-linking agent 2,2-bis[3-amino-4-(N-phenylamino))phenyl]hexafluoropropane with respect to 100 parts by mass of the fluorine-containing elastomer obtained in Production Example 1 with an open roll. The phosphorus content of the obtained fluorine-containing elastomer composition was measured to be less than 20 ppm by the method described above.

The obtained fluorine-containing elastomer composition was crosslinked by pressing at 180° C. for 30 minutes, and then further crosslinked in an oven at 290° C. for 18 hours to obtain a molded article.

Further, a fluorine-containing elastomer composition with a phosphorus content of less than 20 ppm and a molded article can also be obtained in the same manner as in Preparation Example 1, except that the hyperbranched polymer obtained in Synthesis Example 1 or Synthesis Example 2 was used instead of the hyperbranched polymer obtained in Synthesis Example 3.

Preparation Example 2

A fluorine-containing elastomer composition and a molded article were obtained in the same manner as in Preparation Example 1, except that the hyperbranched polymer obtained in Synthesis Example 4 was used instead of the hyperbranched polymer obtained in Synthesis Example 3.

The phosphorus content of the obtained fluorine-containing elastomer composition was measured to be less than 20 ppm by the method described above.

Further, because the content of residual NMP of the hyperbranched polymer used in the preparation was 101 ppm, the content of residual DMAc was less than 1 ppm, and no other solvent was used in Preparation Example 2, the content of the amide solvent and the solvent not containing a fluorine atom in the obtained fluorine-containing elastomer composition were estimated to be 101 ppm or less.

Preparation Example 3

A fluorine-containing elastomer composition and a molded article were obtained in the same manner as in Preparation Example 1, except that the hyperbranched polymer obtained in Synthesis Example 5 was used instead of the hyperbranched polymer obtained in Synthesis Example 3.

The phosphorus content of the obtained fluorine-containing elastomer composition was measured to be less than 20 ppm by the method described above.

Further, because the content of residual NMP of the hyperbranched polymer used in the preparation was 20 ppm, the content of DMAc was 40 ppm, and no other solvent was used in Preparation Example 3, the content of the amide solvent and the solvent not containing a fluorine atom in the obtained fluorine-containing elastomer composition were estimated to be 60 ppm or less.

Preparation Example 4

A fluorine-containing elastomer composition and a molded article were obtained in the same manner as in Preparation Example 1, except that the hyperbranched polymer obtained in Synthesis Example 6 was used instead of the hyperbranched polymer obtained in Synthesis Example 3.

The phosphorus content of the obtained fluorine-containing elastomer composition was measured to be less than 20 ppm by the method described above.

Further, because the content of residual NMP of the hyperbranched polymer used in the preparation was less than the detection limit (less than 1 ppm), the content of residual DMAc was 280 ppm, and no other solvent was used in Preparation Example 4, the content of the amide solvent and the solvent not containing a fluorine atom in the obtained fluorine-containing elastomer composition were estimated to be 280 ppm or less.

The invention claimed is:

1. A composition, comprising:
a fluorine-containing polymer; and
a silicon-containing compound,
wherein a phosphorus content in the composition is 20 ppm or less,
the silicon-containing compound is a cage-type silsesquioxane represented by formula (I):

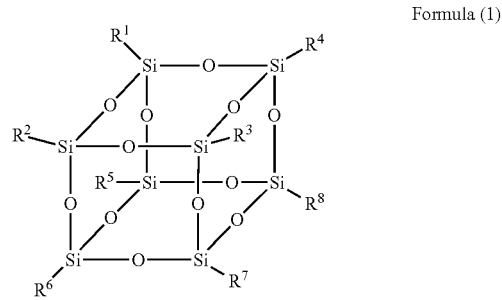

Formula (1)

wherein $R^1$ to $R^8$ are each independently a hydrogen atom, a halogen atom, or an organic group, and at least one of $R^1$ to $R^8$ is an organic group, and
the cage-type silsesquioxane is a hyperbranched polymer.

2. The composition according to claim 1,
wherein in formula (1), $R^1$ to $R^8$ each independently include a terminal group T represented by formula (2):

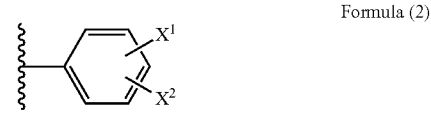

Formula (2)

wherein $X^1$ and $X^2$ are each independently —$NH_2$, —OH, —SH, —H, —NH—CO—$CF_3$, —NH—CO—Ar, wherein Ar is a substituted or unsubstituted aryl group, a group represented by the following formula:

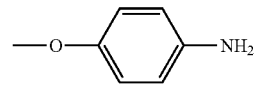

a group represented by the following formula:

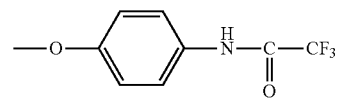

or a group represented by the following formula:

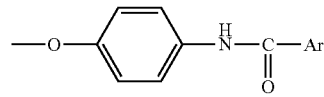

wherein Ar is a substituted or unsubstituted aryl group.

3. The composition according to claim 1, wherein the fluorine-containing polymer is a fluorine-containing elastomer.

4. The composition according to claim 1, wherein a content of the silicon-containing compound is 0.5 to 100 parts by mass with respect to 100 parts by mass of the fluorine-containing polymer.

5. The composition according to claim 1, wherein a content of an amide solvent in the composition is less than 1000 ppm.

6. The composition according to claim 1, wherein a content of a solvent not containing a fluorine atom in the composition is less than 1000 ppm.

7. The composition according to claim 1, further comprising a cross-linking agent.

8. The composition according to claim 1, wherein the composition is a molding material.

9. A molded article obtained from the composition according to claim 1.

* * * * *